US012687268B2

(12) United States Patent
HAN et al.

(10) Patent No.: US 12,687,268 B2
(45) Date of Patent: Jul. 21, 2026

(54) LAMP MODULE AND VEHICLE LAMP INCLUDING THE SAME

(71) Applicant: SL Corporation, Daegu (KR)

(72) Inventors: Hyo Jin HAN, Gyeongsan-si (KR); Jun Yeong Park, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 19/073,262

(22) Filed: Mar. 7, 2025

(65) Prior Publication Data

US 2025/0334243 A1 Oct. 30, 2025

(30) Foreign Application Priority Data

Mar. 25, 2024 (KR) ........................ 10-2024-0040639

(51) Int. Cl.

*F21S 41/36* (2018.01)
*F21S 41/24* (2018.01)
*F21S 41/32* (2018.01)
*F21W 102/155* (2018.01)

(52) U.S. Cl.

CPC ............. *F21S 41/24* (2018.01); *F21S 41/321* (2018.01); *F21S 41/36* (2018.01); *F21W 2102/155* (2018.01)

(58) Field of Classification Search

CPC .......... F21S 41/321; F21S 41/36; F21S 41/24; F21S 41/27; G02B 6/00; G02B 6/0001; F21V 2200/00; F21W 2102/155; F21W 2102/135; B60Q 1/04

See application file for complete search history.

(56) References Cited

U.S. PATENT DOCUMENTS

2014/0362596 A1* 12/2014 Nakaya ................. F21S 41/148 362/511
2023/0050282 A1* 2/2023 Mun .................. G02B 19/0028

FOREIGN PATENT DOCUMENTS

JP 2020035699 A * 3/2020
KR 20190032752 A * 3/2019 ............ F21S 43/235

OTHER PUBLICATIONS

Search English translation of JP-2020035699-A (Year: 2020).*
Search English translation of KR 20190032752 A (Year: 2019).*

* cited by examiner

*Primary Examiner* — Omar Rojas Cadima
(74) *Attorney, Agent, or Firm* — United One Law Group LLC; Kongsik Kim; Jhongwoo Peck

(57) ABSTRACT

A lamp module includes a light source that generates light; and a light guide for guiding the light incident thereto from the light source to be emitted. The light guide includes: a light-receiving portion to which the light is incident from the light source; and a guiding member at allows at least a portion of the light incident on the light-receiving portion to be transmitted to a light-emission portion and emitted from the light-emission portion to form a predetermined beam pattern. The guiding member includes: a lower reflective portion that is disposed under an optical axis of the light-emission portion and reflects a portion of the light incident on the light-receiving portion upwardly of the optical axis; and an upper reflective portion that is disposed above the optical axis and reflects the light reflected from the lower reflective portion toward the light-emission portion.

13 Claims, 30 Drawing Sheets

1000

LAMP MODULE AND VEHICLE LAMP INCLUDING THE SAME

CROSS-REFERENCE TO RELATED APPLICATION

This application claims priority from Korean Patent Application No. 10-2024-0040639 filed on Mar. 25, 2024, which is incorporated herein by reference in its entirety.

BACKGROUND

1. Technical Field

The present disclosure relates to a lamp module and a vehicle lamp including the same, and more particularly, to a lamp module for forming an optimal beam pattern while implementing a slim form factor. The present disclosure also relates to a vehicle lamp including the same.

2. Description of Related Art

In general, a vehicle is provided with various lamps having an illumination function for more easily identifying an object located around the vehicle during low-light conditions (e.g., night-time driving) and a signaling function for notifying other vehicles or road users of the driving state of the vehicle.

For example, a headlamp and a fog lamp are mainly used for the illumination functions, and a turn signal lamp, a tail lamp, and a brake lamp are mainly used for the signaling functions. Each lamp is stipulated by law in terms of its installation standards and specifications so that each lamp may fully perform each function.

In this regard, the headlamp serves to secure the driver's front view by irradiating light in the driving direction of the vehicle. For example, the headlamp forms a low beam pattern that allows light to be irradiated below the cut-off line so as to prevent glare from occurring to the driver of a vehicle in front of the present vehicle, such as a preceding vehicle or an on-coming vehicle, thereby securing a wider field of view of a relatively shorter distance in front of the vehicle, or a high beam pattern that secures a longer field of view of a relatively longer distance in front of the vehicle.

In this regard, in forming the low beam pattern, a portion of the light generated from the light source is blocked in order to form the cut-off line, which may lead to light losses and deterioration of light efficiency.

In addition, in recent years, not only a functional aspect of helping a driver to drive safely by enabling the driver to secure a field of view, which is a basic role of a headlamp, but also an aesthetic aspect that consumers feel through an improvement in outer appearance design has a great influence on the consumers' purchase decisions.

Therefore, there is a need for a scheme for forming an optimal beam pattern while realizing a slim outer appearance design to allow for improved aesthetics and light efficiency by reducing light loss.

SUMMARY

An object to be achieved by the present disclosure is to provide a lamp module for improving light efficiency by reducing light loss due to blocked light in forming a cut-off line while implementing a slim form factor, and a vehicle lamp including the same.

In addition, an object of the present disclosure is to provide a lamp module capable of preventing light from being irradiated in an unnecessary direction by adjusting a shape of a surface from which the light is emitted, and forming an optimal beam pattern, and a vehicle lamp including the same.

The technical objects of the present disclosure are not limited to those mentioned above, and other technical objects not mentioned may be clearly understood by those skilled in the art from descriptions as set forth below.

In order to achieve the above objects, a lamp module according to an embodiment of the present disclosure may include a light source that generates light; and a light guide for guiding the light incident thereto from the light source to be emitted. The light guide may include a light-receiving portion to which the light is incident from the light source; a light-emission portion from which the light is emitted; and a guiding member that allows at least a portion of the light incident on the light-receiving portion to be transmitted to the light-emission portion and emitted from the light-emission portion to form a predetermined beam pattern. The guiding member may include a lower reflective portion that is disposed under an optical axis of the light-emission portion and reflects a portion of the light incident on the light-receiving portion upward of the optical axis of the light-emission portion; and an upper reflective portion that is disposed above the optical axis of the light-emission portion and reflects the light reflected from the lower reflective portion toward the light-emission portion.

The light-receiving portion may include a first light-receiving module disposed above the optical axis of the light-emission portion; and a second light-receiving module disposed under the optical axis of the light-emission portion. Light incident to an upper region of the light-receiving portion may be focused on a rear focus of the light-emission portion by the first light-receiving module, and light incident to a lower region of the light-receiving portion may be incident to the second light-receiving module and may be focused on the rear focus of the light-emission portion through the lower reflective portion and the upper reflective portion.

The first light-receiving module and the second light-receiving module may be formed asymmetrically with each other so as to have different light concentration characteristics. In some embodiments, the first light-receiving module and the second light-receiving module may have different curvatures in at least one direction. In some embodiments, the first light-receiving module and the second light-receiving module may be formed to have different dimensions in at least one direction.

The lower reflective portion may include a first reflective surface that reflects light incident on the second light-receiving module so as to proceed laterally; and a second reflective surface that is disposed on a side of the first reflective surface and reflects the light reflected from the first reflective surface so as to proceed upwardly. The upper reflective portion may reflect the light reflected upwardly from the second reflective surface so as to proceed in a frontward direction.

The light incident on the second light-receiving module may proceed as a light beam substantially parallel to the optical axis of the light-emission portion, and each of the first reflective surface and the second reflective surface of the lower reflective portion may exhibit a planar shape.

The light incident on the second light-receiving module may be focused on the rear focus of the light-emission portion, and at least one of the first reflection surface or the second reflection surface of the lower reflective portion may exhibit a curved shape to allow the light incident on the second light-receiving module to be converted into substantially parallel light. The first light-receiving module and the second light-receiving module may be formed symmetrically with each other so as to have substantially same light concentration characteristics.

The guiding member may further include a shield portion having a front end disposed at a rear focus of the light-emission portion so as to obstruct a portion of light that proceeds toward the light-emission portion such that a cut-off line of the beam pattern is formed.

The lower reflective portion may further include a transmission portion that allows a portion of the light incident on the second light-receiving module to transmit therethrough, and light that passes through the transmission portion pay proceed through a connection surface to the light-emission portion to form an additional beam pattern, wherein the connection surface connects a front end of the shield portion and a lower surface of the guiding member.

The shield portion may further include a shield groove disposed behind the front end and concavely formed to allow a portion of the cut-off line to be depressed downwardly.

The light-emission portion may include a plurality of light-emission surfaces arranged in a left-right direction, and at least one of a curvature, a formation angle, or a size of at least one of the plurality of light-emission surfaces may be different from at least another of the plurality of light-emission surfaces.

The guiding member may further include a concave portion formed concavely in an upper surface thereof to allow a lower boundary line of the beam pattern to be shifted upwardly. The concave portion may allow a portion of the light incident to the light-emission portion that proceeds through an upper space above a rear focus of the light-receiving portion to be irradiated to a region disposed below the beam pattern.

In order to achieve the above purpose, a vehicle lamp according to an embodiment of the present disclosure may form a beam pattern using a plurality of lamp units arranged in a left-right direction, and each of the plurality of lamp units may include at least one lamp module. The lamp module may include a light source that generates light, and a light guide that guides the light incident thereon from the light source to be emitted. The light guide may include a light-receiving portion to which the light is incident from the light source; and a guiding member that receives the light incident on the light-receiving portion and guides the received light. The at least one lamp module of each of the plurality of lamp units may include a first lamp module for forming a first light distribution pattern; and a second lamp module for forming a second light distribution pattern.

A light-receiving surface of the guiding member may be formed to have a step in a front-rear direction such that positions of the plurality of lamp units may be shifted rearward as the positions thereof are arranged from one side to the other side along a left-right direction.

Guiding members of the respective at least one lamp modules of the plurality of lamp units may be integrally formed with one another.

At least one of the plurality of lamp units may include a plurality of lamp modules, and the guiding member of each of the plurality of lamp modules may constitute a common light-receiving surface. The light guide may further include a light-emission portion, which includes a plurality of light-emission surfaces arranged in a left-right direction, and a side surface between the light-emission surfaces adjacent to each other among the plurality of light-emission surfaces of the light-emission portion of the at least one lamp module may be inclined such that the side surface is closer to either an inside or an outside of the vehicle as the side surface extends from front to back.

The specific details of other embodiments are included in the detailed description and drawings.

According to the lamp module of the present disclosure as described above and the vehicle lamp including the same, one or more of following effects are provided.

Since the light incident from the light source to the upper portion of the light-receiving portion is focused by the light-receiving portion at a rear focus of the light-emission portion, and the light incident to the lower portion of the light-receiving portion is focused by the lower reflective portion and the upper reflective portion at a rear focus of the light-emission portion, a portion of the light proceeding from the light-receiving portion to the light-emission portion in order to form a cut-off line can be prevented from being lost, thereby improving light efficiency.

In addition, since the optical system for respectively forming a plurality of different beam patterns may be used in a shared manner, the configuration may be simplified, and the cost may be reduced.

In addition, an optimal beam pattern may be formed by adjusting a shape of each of the plurality of light-emission surfaces constituting the light-emission portion of the lamp module.

The effects of the present disclosure are not limited to those mentioned above, and other effects not mentioned will be clearly understood by those skilled in the art from the present description.

BRIEF DESCRIPTION OF THE DRAWINGS

The above and other aspects and features of the present disclosure will become more apparent by describing in detail illustrative embodiments thereof with reference to the attached drawings, in which.

DETAILED DESCRIPTIONS

Figure 1:
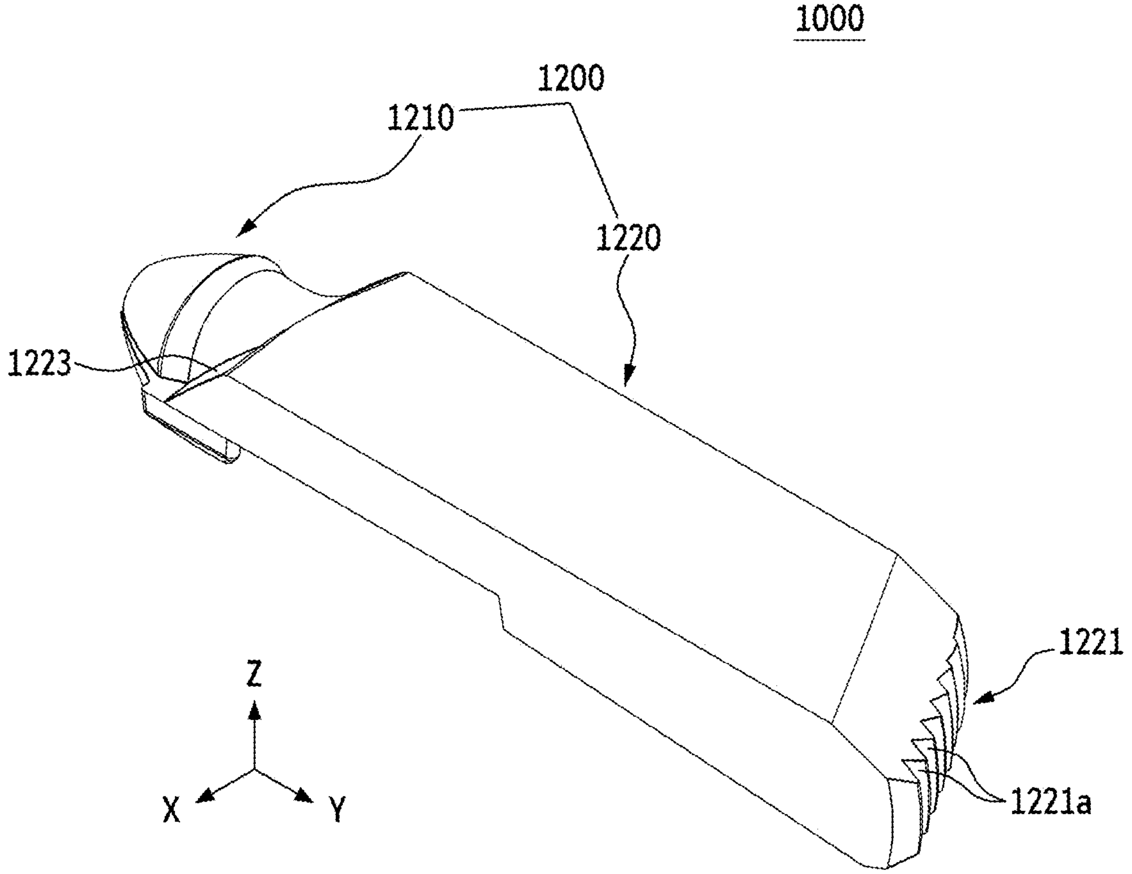
FIGS. 1 to 4 are perspective views showing a lamp module according to an embodiment of the present disclosure.
Figure 2:
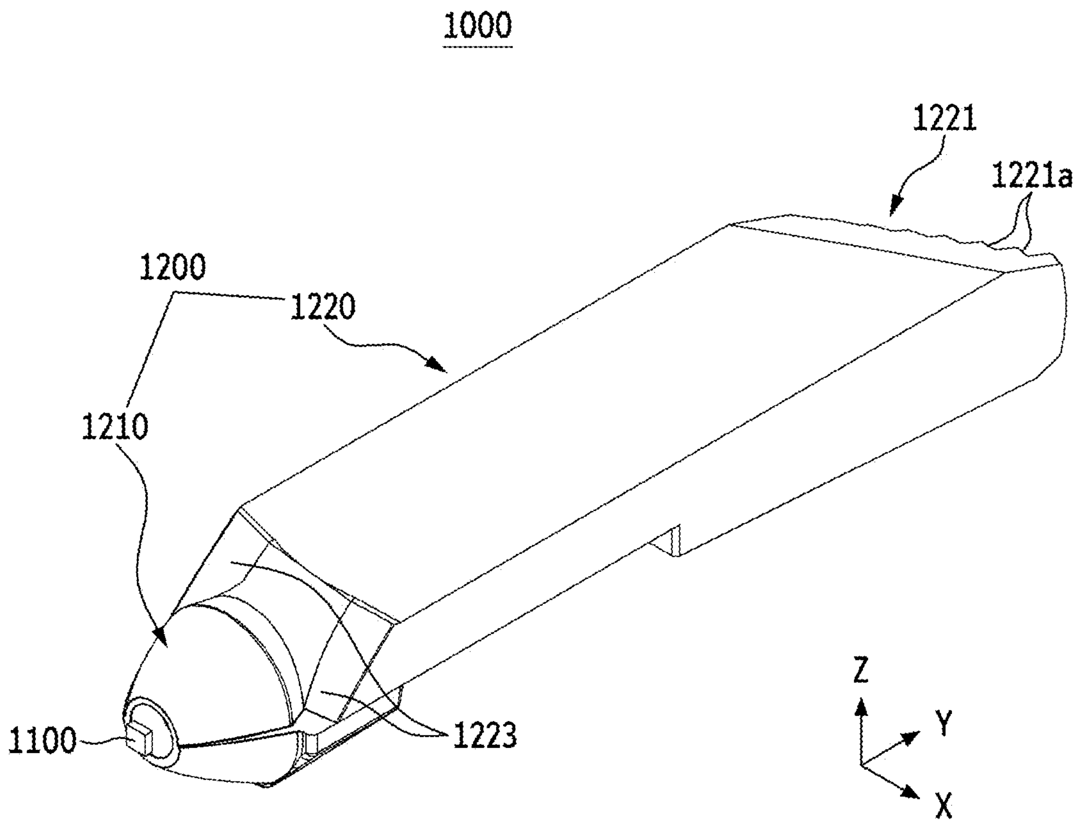
Figure 3:
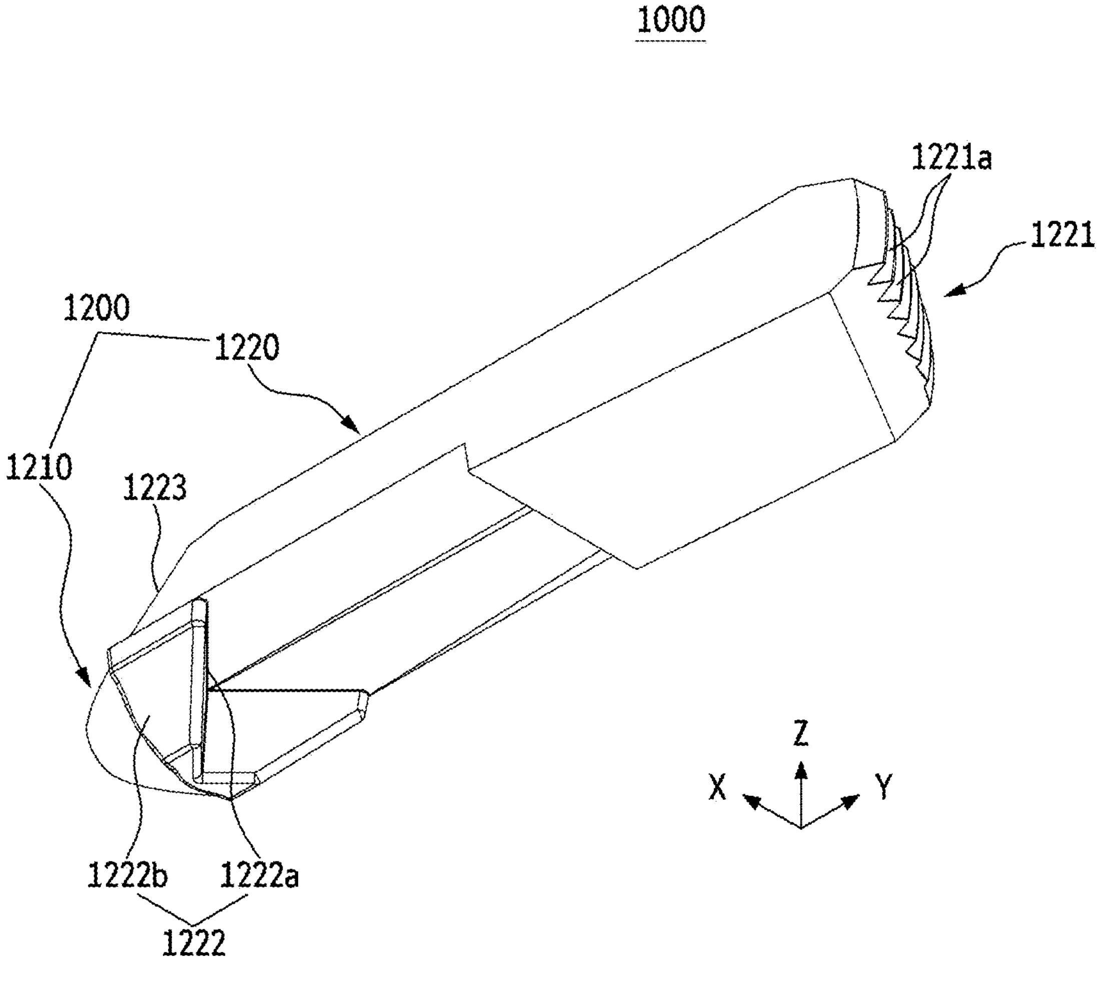
Figure 4:
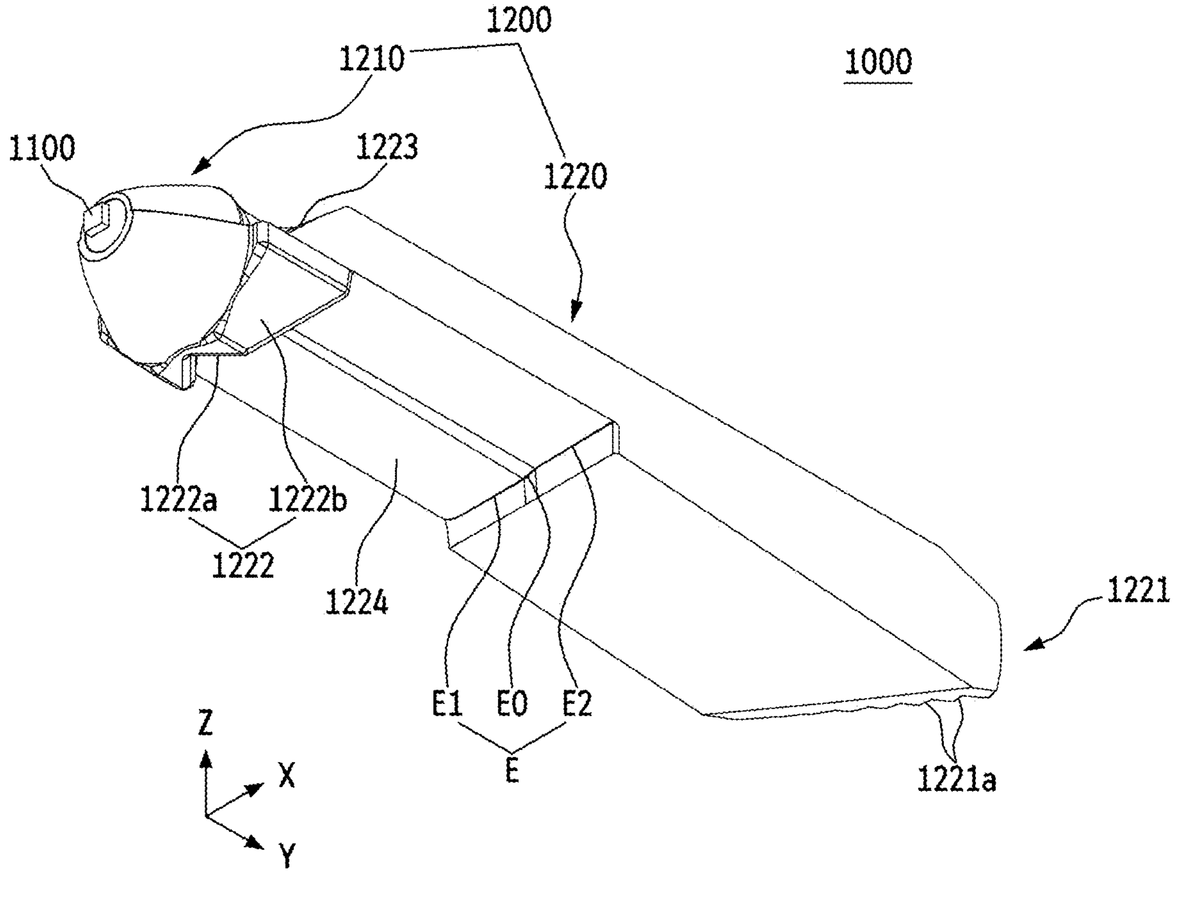

Advantages and features of the present disclosure and methods of accomplishing the same may be understood more readily by referring to the following detailed description of exemplary embodiments and the accompanying drawings. The present disclosure may, however, be embodied in different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to drawings for illustrating a lamp module and a vehicle lamp including the same according to embodiments of the present disclosure.

Figure 5:
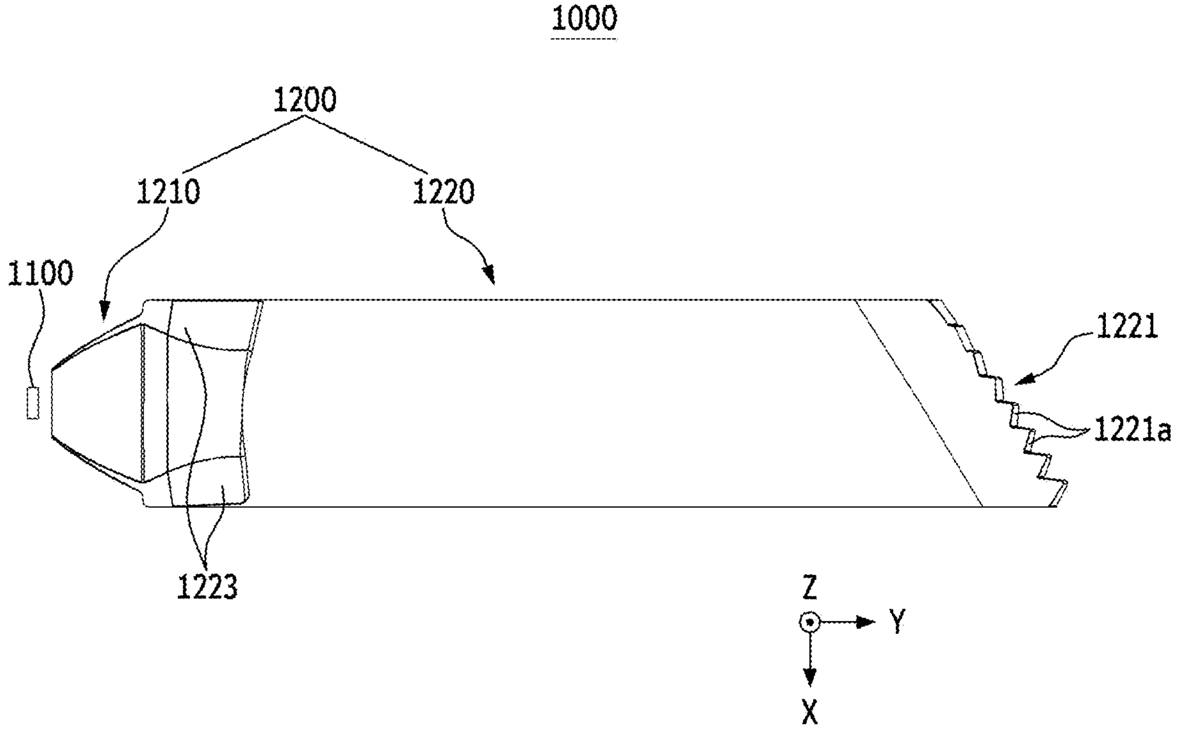
FIG. 5 is a plan view showing a lamp module according to an embodiment of the present disclosure.
Figure 6:
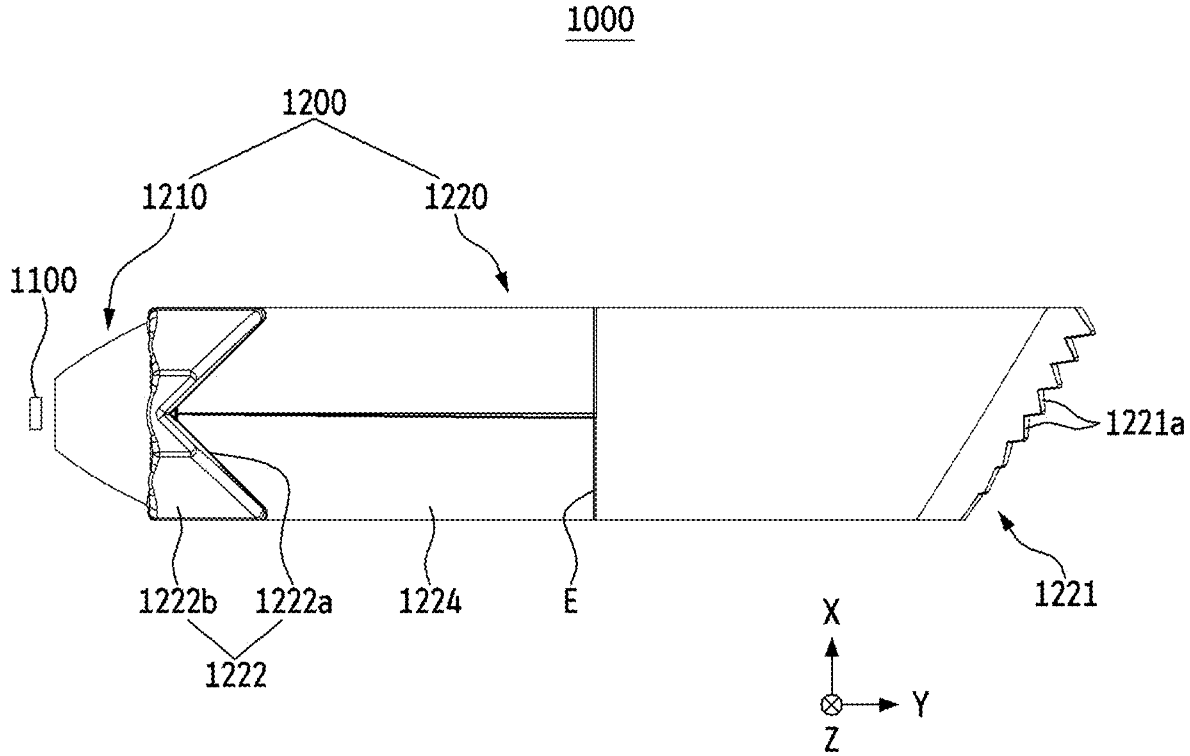
FIG. 6 is a bottom view showing a lamp module according to an embodiment of the present disclosure.
Figure 7:
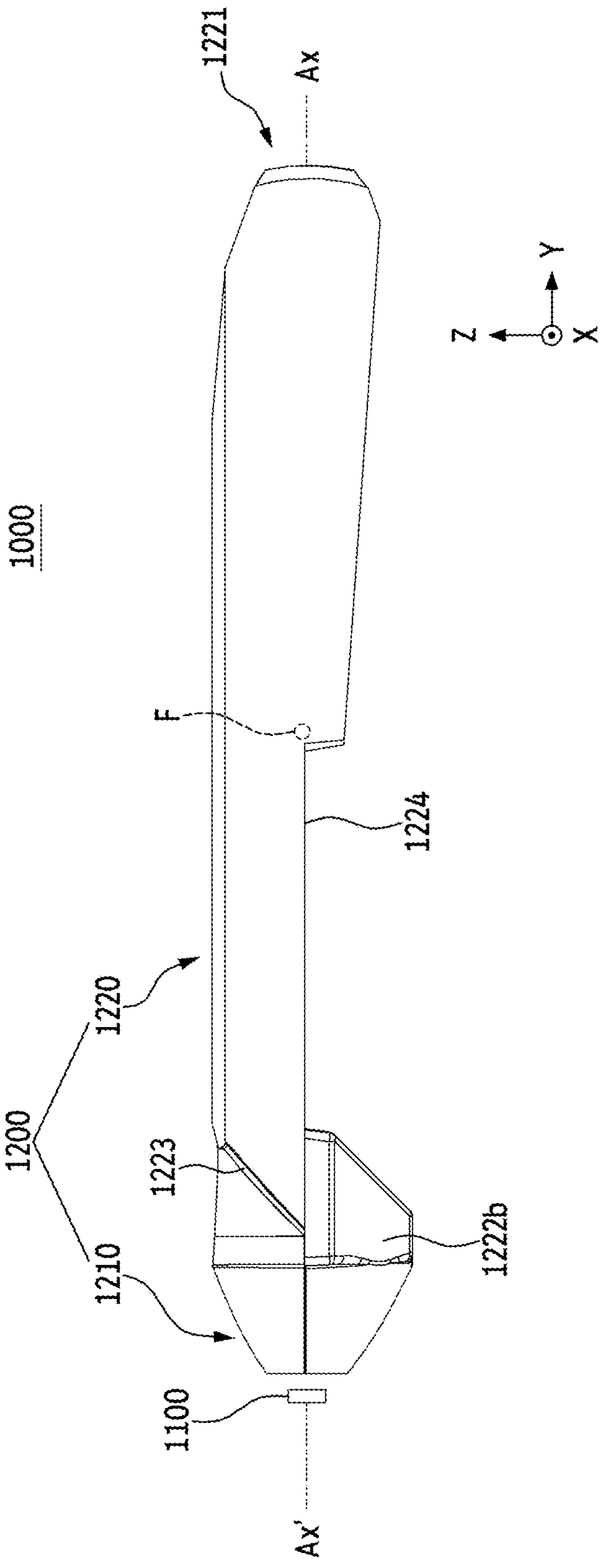
FIG. 7 is a side view showing a lamp module according to an embodiment of the present disclosure.

FIGS. 1 to 4 are perspective views showing a lamp module according to an embodiment of the present disclosure, FIG. 5 is a plan view showing a lamp module according to an embodiment of the present disclosure, FIG. 6 is a bottom view showing a lamp module according to an embodiment of the present disclosure, and FIG. 7 is a side view showing a lamp module according to an embodiment of the present disclosure.

Referring to FIGS. 1 to 7, a lamp module 1000 according to an embodiment of the present disclosure may include a light source 1100 and a light guide 1200.

In an embodiment of the present disclosure, a case in which the lamp module 1000 is used as a head lamp for securing a front view of a vehicle by irradiating light in a driving direction of the vehicle when the vehicle is operated at night or in a dark place such as a tunnel will be described. However, the present disclosure is not limited thereto, and the lamp module 1000 of the present disclosure may be used not only for a head lamp but also for various lamps installed in the vehicle, such as a tail lamp, a brake lamp, a daytime running lamp, a turn signal lamp, a fog lamp, a backup lamp, a position lamp, and the like, and the lamp module 1000 of the present disclosure may be used for any one of the above-described various purposes or may be used for two or more purposes.

In addition, in an embodiment of the present disclosure, a case in which an X-axis direction means a vehicle width direction as a left-right direction (e.g., a lateral direction), a Y-axis direction means a front-rear direction (forward or backward) as a driving direction (e.g., a longitudinal direction), and a Z-axis direction means a vehicle height direction as a vertical direction (e.g., an up-down direction) will be described by way of example. However, the present disclosure is not limited thereto, and the directions which the X-axis, the Y-axis, and the Z-axis actually mean may vary depending on the position at or the direction in which the lamp module 1000 of the present disclosure is installed.

When the lamp module 1000 of the present disclosure is used as a head lamp, the lamp module 1000 may form at least one of a low beam pattern for securing a wider field of view within a proximate distance in front of the vehicle by irradiating light below the cut-off line so that glare does not occur to a driver of a vehicle in front of the present vehicle, such as a preceding vehicle or an on-coming vehicle, or a high beam pattern for securing a more distant field of view for a longer distance in front of the vehicle.

Figure 8:
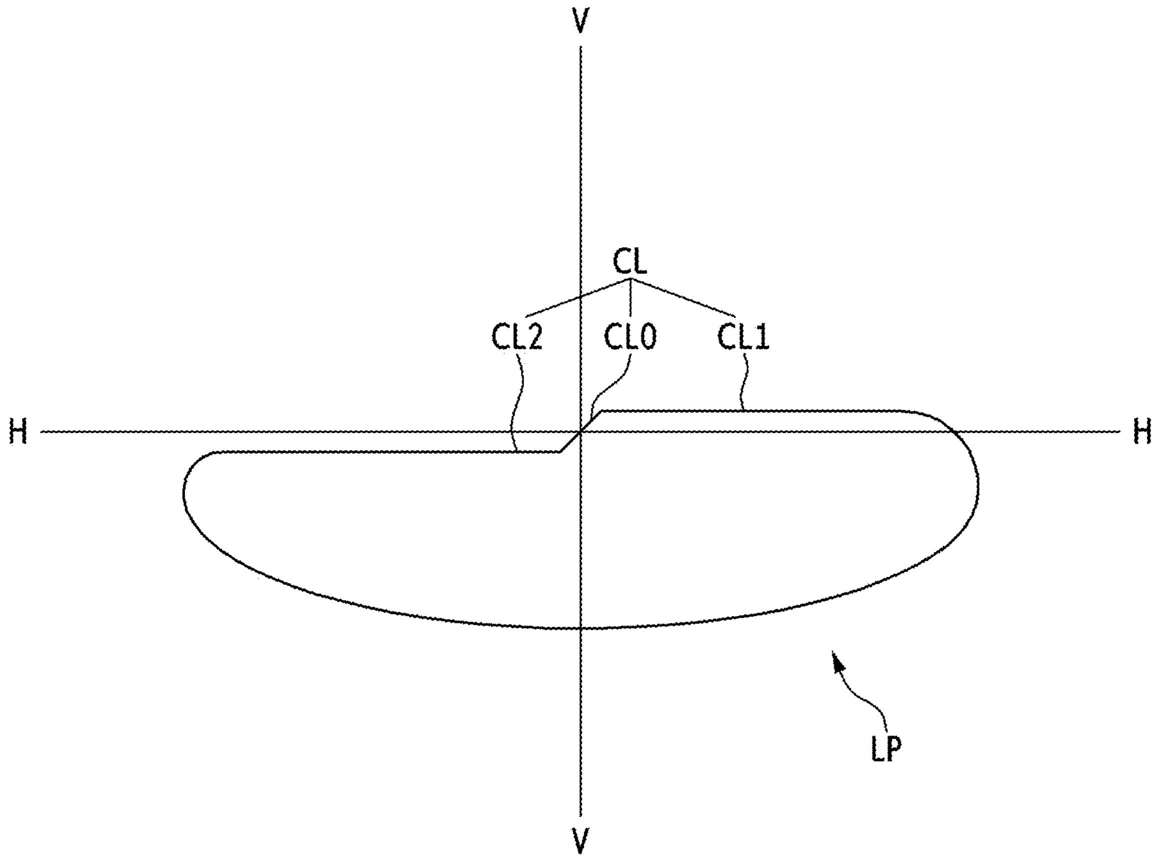
FIG. 8 is a schematic view showing a beam pattern formed by a lamp module according to an embodiment of the present disclosure.

Hereinafter, in an embodiment of the present disclosure, a case in which the lamp module 1000 of the present disclosure forms the low beam pattern LP in which light is irradiated below the cut-off line CL as shown in FIG. 8 will be described by way of example. A case in which the low beam pattern LP of FIG. 8 is a beam pattern formed by light irradiated on a screen positioned at a set distance in front of the vehicle from the lamp module 1000 of the present disclosure will be described by way of example.

In some embodiments of the present disclosure, the cut-off line CL may include a first line CL1, a second line CL2, and an inclined line CL0 that connects the first line CL1 and the second line CL2. The first line CL1 may correspond to the driving lane and may be formed at a higher position than the second line CL2, which may correspond to the opposite lane, so that a step is defined between the first line CL1 and the second line CL2. Accordingly, the light irradiation distance for the driving lane may be relatively greater than the light irradiation distance for the opposite lane. However, the present disclosure is not limited thereto. The cut-off line CL may be formed to extend in a parallel manner to a horizontal line. In this case, the inclined line CL0 may be omitted, and the first line CL1 and the second line CL2 may be formed into a single flat line without a step therebetween.

In some embodiments of the present disclosure, a case in which the low beam pattern LP is formed by a single lamp module 1000 is described by way of example. However, this is merely an example for helping understanding of the present disclosure, and the present disclosure is not limited thereto. When two or more lamp modules are used, different light distribution patterns that are respectively formed by the two or more lamp modules may be combined with one another to form the low beam pattern LP.

For example, when the low beam pattern LP is formed by two or more lamp modules, one of the two or more lamp modules may form a light distribution pattern of the low beam pattern LP corresponding to a high illuminance area having a relatively higher brightness in order to secure a sufficient viewing distance, while another lamp module may secure a wider field of view in front of the vehicle, and to form a light distribution pattern of the low beam pattern LP corresponding to a spread area having a lower brightness than the high illuminance area but spreading in at least one of the left-right direction or the vertical direction around the high illuminance area.

The light source 1100 may include at least one light source that generates light of an amount and/or color suitable for the use of the lamp module 1000 of the present disclosure.

In an embodiment of the present disclosure, a case in which a semiconductor light-emitting device such as a light-emitting diode (LED) is used as at least one light source will be described by way of example. However, the present disclosure is not limited thereto, and various types of light sources such as a laser diode (LD) or a bulb as well as an LED may be used as at least one light source, and optical elements for adjusting the properties of light such as brightness, path, and color of light such as a reflector, a phosphor, a mirror, and a prism may be additionally used depending on the type of the light source.

The light guide 1200 may be disposed in front of the light source 1100 to guide at least a portion of the light incident thereto from the light source 1100 to be emitted in a frontward direction to form at least one beam pattern. To this end, the light source 1100 may be disposed such that a light-emitting surface or a light-emitting area thereof faces in the frontward direction.

In this regard, the light guide 1200 being disposed in front of the light source 1100 may indicate the positions of the light source 1100 and the light guide 1200 when it is assumed that the direction in which the light is emitted from the lamp module 1000 of the present disclosure is the frontward direction. The actual direction that is referred to by "the frontward direction" may vary depending on the position at or a direction in which the lamp module 1000 of the present disclosure is installed.

The light guide 1200 may include a light-receiving portion 1210 and a guiding member 1220. The light-receiving portion 1210 may receive the light emitted from the light source 1100, and at least a portion of the light incident on the light-receiving portion 1210 may be guided by the guiding member 1220 to be emitted through a light-emission portion 1221, which constitutes a front end of the guiding member 1220 to form a beam pattern suitable for the use of the lamp module 1000 of the present disclosure.

In this regard, the light-receiving portion 1210 and a light-receiving surface of the guiding member 1220 may be integrally formed with each other. As the light-emission portion 1221 constitutes the front end of the guiding member 1220, the number of components may be reduced compared to the case where the light-receiving portion 1210 and the guiding member 1220 are individually formed and assembled with each other, thereby simplifying the assembly process and reducing the cost.

The light-receiving portion 1210 may be constructed such that an upper area and a lower area with respect to an optical axis Ax of the light-emission portion 1221, that is, an axis substantially that is parallel to the front-rear direction and passes through a focus F in rear of the light-emission portion 1221 may have same (e.g., homogeneous) or different (e.g., non-homogeneous or heterogeneous) concentration characteristics.

In this regard, the rear focus F of the light-emission portion 1221 may be formed as a shape of a point, a line, a surface, a space, or a combination thereof based on an area on which light is actually condensed.

The upper region and the lower region of the light-receiving portion 1210 having different concentrations may include not only a case in which the light is condensed at different focuses, but also a case in which the light incident to one of the upper region or the lower region of the light-receiving portion 1210 is condensed at the focus while the light incident to the other thereof proceeds as substantially a parallel light beam.

Figure 9:
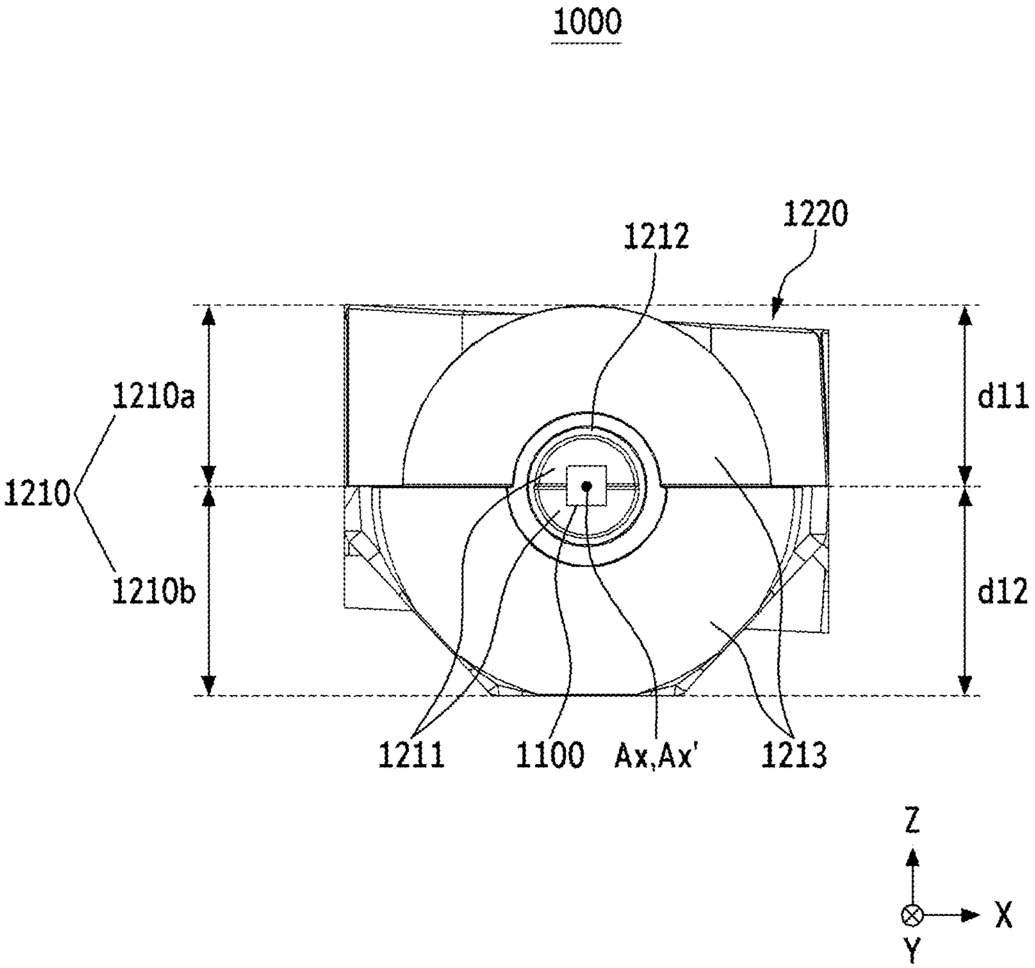
FIG. 9 is a rear view showing a light-receiving portion of a light guide according to an embodiment of the present disclosure.
Figure 10:
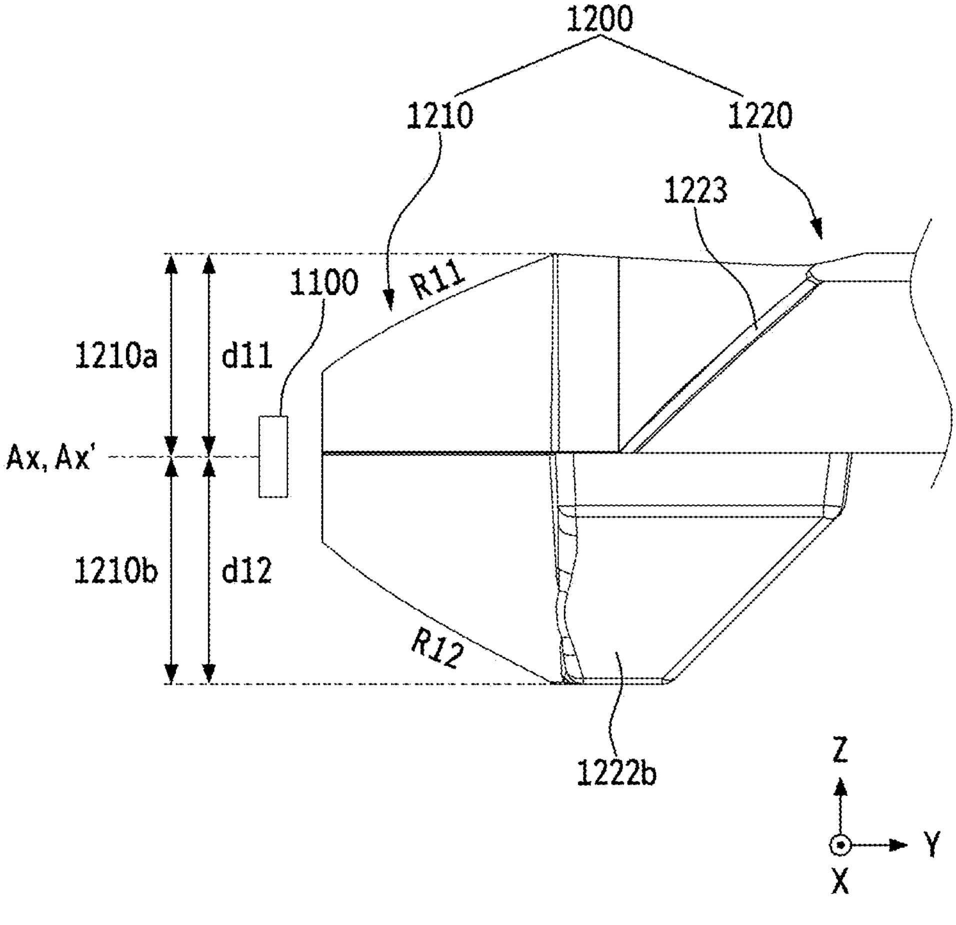
FIG. 10 is a side view illustrating a light-receiving portion of a light guide according to an embodiment of the present disclosure.
Figure 11:
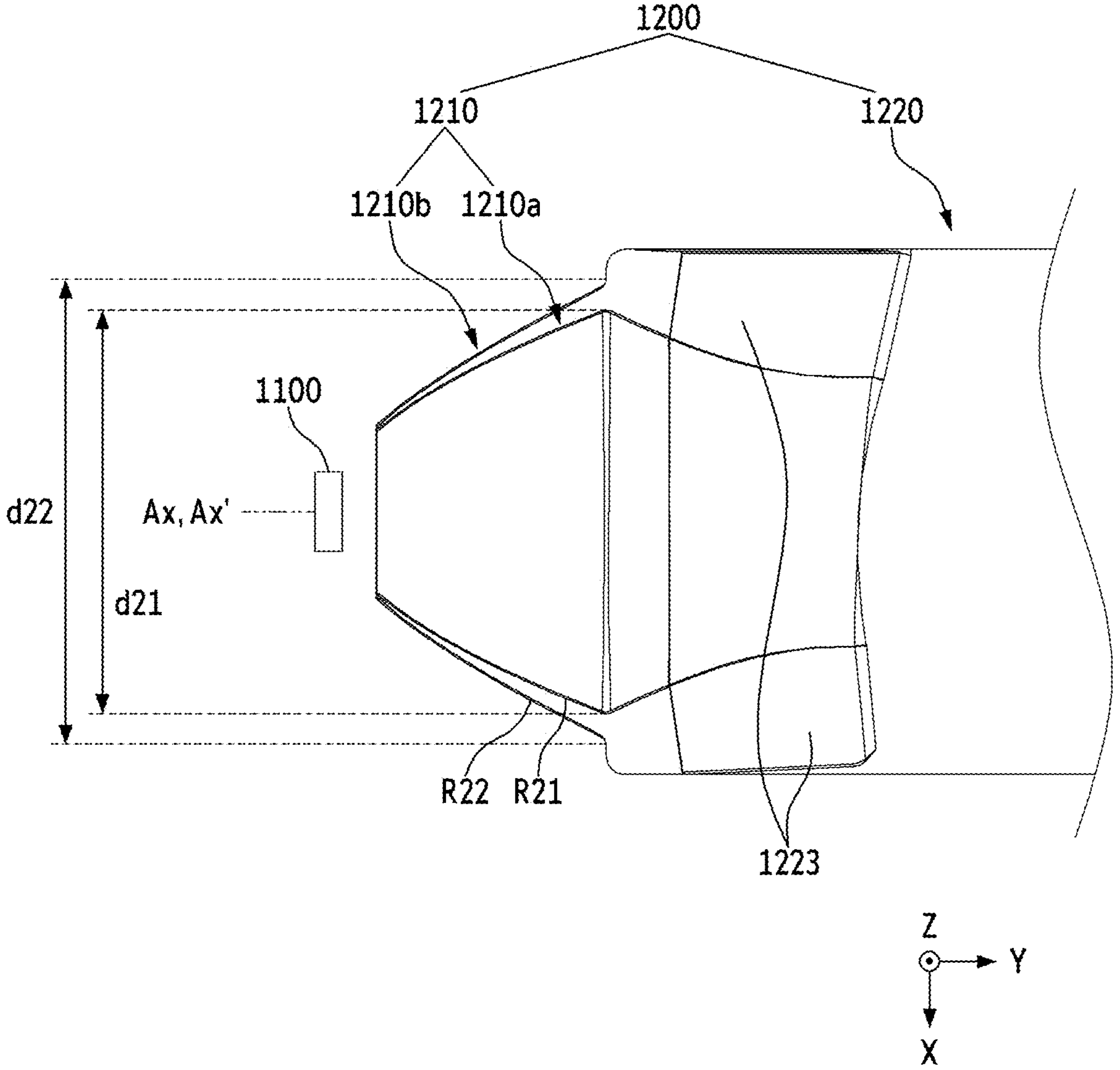
FIG. 11 is a plan view showing a light-receiving portion of a light guide according to an embodiment of the present disclosure.

FIG. 9 is a rear view illustrating the light-receiving portion of the light guide according to an embodiment of the present disclosure, FIG. 10 is a side view illustrating the light-receiving portion of the light guide according to an embodiment of the present disclosure, and FIG. 11 is a plan view illustrating the light-receiving portion of the light guide according to an embodiment of the present disclosure.

Referring to FIGS. 9 to 11, the light-receiving portion 1210 according to an embodiment of the present disclosure may be asymmetrically formed such that the light beams respectively incident on the upper area and the lower area with respect to the optical axis Ax of the light-emission portion 1221 are concentrated with different powers.

In an embodiment of the present disclosure, a case where the optical axis Ax' of the light source 1100 coincides with the optical axis Ax of the light-emission portion 1221 will be described by way of example. However, the present disclosure is not limited thereto, and the optical axis Ax' of the light source 1100 may not coincide with the optical axis Ax of the light-emission portion 1221, depending on a light distribution characteristic required in a beam pattern to be formed by the lamp module 1000 of the present disclosure, for example, a position, shape, size, brightness, and the like of an area to which the light is to be irradiated.

In this regard, when the light source 1100 is configured to include a single light source, an axis that passes through the center of the light-emitting surface of the single light source in the perpendicular manner thereto may be defined as the optical axis Ax' of the light source 1100. When the light source 1100 is configured to include a plurality of light sources, an axis that passes through the center of the light-emitting area formed by the light-emitting surface of each of the plurality of light sources in the perpendicular manner thereto may be defined as the optical axis Ax' of the light source 1100.

The light-receiving portion 1210 may include a first light-receiving module 1210*a* disposed above the optical axis Ax of the light-emission portion 1221 and a second light-receiving module 1210*b* disposed below the optical axis Ax of the light-emission portion 1221. The upper portion and the lower portion of the light-receiving portion 1210 being asymmetrically formed with each other with respect to the optical axis Ax of the light-emission portion 1221 may mean that the first light-receiving module 1210*a* and the second light-receiving module 1210*b* are formed to be asymmetrical with each other.

The light-receiving portion 1210 may include a central surface 1211 centered on the optical axis Ax of the light-emission portion 1221, a protruding surface 1212 that protrudes from the peripheral edge of the central surface 1211 toward the light source 1100, and a reflective surface 1213 that allows the light incident onto the protruding surface 1212 to be reflected therefrom to proceed in the frontward direction.

In this regard, the first light-receiving module 1210*a* may be configured such that each of the center surface 1211, the protruding surface 1212, and the reflective surface 1213 thereof are disposed above the optical axis Ax of the light-emission portion 1221. Similarly, the second light-receiving module 1210*b* may be configured such that each of the center surface 1211, the protruding surface 1212, and the reflective surface 1213 thereof are disposed below the optical axis Ax of the light-emission portion 1221.

The asymmetrical configuration of the first light-receiving module 1210*a* and the second light-receiving module 1210*b* may include a case in which the first light-receiving module 1210*a* and the second light-receiving module 1210*b* have different dimensions in at least one of the vertical direction or the left-right direction and a case in which they have different curvatures in at least one of the vertical direction or the left-right direction.

The first light-receiving module 1210*a* and the second light-receiving module 1210*b* having different dimensions in at least one direction may include a case in which an upper area of each of at least one of the central surface 1211, the protruding surface 1212, and the reflective surface 1213 disposed above the optical axis Ax of the light-emission portion 1221 and a lower area of each of at least one of the central surface 1211, the protruding surface 1212, and the reflective surface 1213 disposed under the optical axis Ax of the light-emission portion 1221 have different lengths in the at least one direction.

In addition, the first light-receiving module 1210*a* and the second light-receiving module 1210*b* having different curvatures in the at least one direction may include a case in which an upper area of each of at least one of the central surface 1211, the protruding surface 1212, and the reflective surface 1213 disposed above the optical axis Ax of the light-emission portion 1221 and a lower area of each of at least one of the central surface 1211, the protruding surface 1212, and the reflective surface 1213 disposed under the optical axis Ax of the light-emission portion 1221 have different curvatures in the at least one direction.

In some embodiments of the present disclosure, a case in which a curvature R11 in the vertical direction and a curvature R21 in the left-right direction of the first light-receiving module 1210*a* are respectively greater than a curvature R12 in the vertical direction and a curvature R22 in the left-right direction of the second light-receiving module 1210*b* will be described by way of example. This configuration is to allow the light incident on the first light-receiving module 1210*a* to be focused on or near the rear focus F of the light-emission portion 1221, while the light incident on the second light-receiving module 1210*b* to proceed as a substantially parallel light beam, which is approximately parallel to the optical axis Ax of the light-emission portion 1221. Detailed description thereof will be provided later below.

As described above, the curvature R11 in the vertical direction and the curvature R21 in the left-right direction of the first light-receiving module 1210*a* may be respectively greater than the curvature R12 in the vertical direction and the curvature R22 in the left-right direction of the second light-receiving module 1210*b*. In this case, due to the differences between the curvatures of the first light-receiving module 1210*a* and the second light-receiving module 1210*b*, a length d11 in the vertical direction (e.g., height) and a length d21 in the left-right direction (e.g., width) of the first light-receiving module 1210*b* may be smaller than a length d12 in the vertical direction and a length d22 in the left-right direction of the second light-receiving module 1210*b*, respectively.

In some embodiments of the present disclosure, a case in which the length in the vertical direction and the length in the left-right direction of each of the first light-receiving module 1210*a* and the second light-receiving module 1210*b* are determined based on the curvature of each of the first light-receiving module 1210*b* and the second light-receiving module 1210*a* will be described by way of example. However, the present disclosure is not limited thereto. Even when the second light-receiving module 1210*b* has a smaller curvature in the vertical direction than the first light-receiving module 1210, the second light-receiving module 1210*b* may have a smaller length in the vertical direction than the first light-receiving module 1210*a*. Even when the second light-receiving module 1210*b* has a smaller curvature in the left-right direction than the first light-receiving module 1210*a*, the second light-receiving module 1210*b* may have a smaller length in the left-right direction than the first light-receiving module 1210*a*.

For example, when at least one of the central surface 1211, the protruding surface 1212, or the reflective surface 1213 is formed such that a step is formed between the upper and lower portions thereof around the optical axis Ax, the length in the left-right direction and the length in the vertical direction of each of the first light-receiving module 1210*a* and the second light-receiving module 1210*b* may not be dependent on the curvature of each of the first light-receiving module 1210*a* and the second light-receiving module 1210*b*.

For convenience of description, FIGS. 10 and 11 as described above show examples of a case in which the curvatures of the upper and lower areas of the reflective surface 1213 respectively disposed above and under the optical axis Ax of the light-emission portion 1221 are different from each other are described by way of example in order to represent the difference between the curvatures of the first light-receiving module 1210*a* and the second light-receiving module 1210*b*. However, the description applied to the reflective surface 1213 may be similarly applied to each of the central surface 1211 and the protruding surface 1212.

The guiding member 1220 may serve to guide at least a portion of the light incident on the light-receiving portion 1210 to be transmitted to the light-emission portion 1221. The light incident on the first light-receiving module 1210*a* may be transmitted through the guiding member 1220 so as to be focused on or near the rear focus F of the light-emission portion 1221 due to a curvature or a formation angle of at least one of the central surface 1211, the protruding surface 1212, or the reflective surface 1213. In an embodiment of the present disclosure, a case in which the light-emission portion 1221 has a convex shape in a frontward direction for concentrating the light will be described by way of example. However, the present disclosure is not limited thereto. The light-emission portion 1221 may have a convex or concave shape in the frontward direction depending on the light distribution characteristics required in a beam pattern to be formed by the lamp module 1000 of the present disclosure.

In addition, the light-emission portion 1221 may include a plurality of light-emission surfaces 1221*a*. This configuration is intended to enable easier control of the path of the light emitted from the lamp module 1000 of the present disclosure. However, the present disclosure is not limited thereto. The light-emission portion 1221 may be formed as a single continuous surface without divided sections depending on light distribution characteristics required in the beam pattern to be formed by the lamp module 1000 of the present disclosure.

In other words, when the light-emission portion 1221 is configured to have a plurality of light-emission surfaces 1221*a* compared to the case in which the light-emission portion 1221 is configured to have a single surface, the light path of the light emitted through each point of the light-emission portion 1221 may be more easily controlled.

In this regard, at least one of the curvature, the formation angle, or the size of one of the plurality of light-emission surfaces 1221*a* may be different that of at least another of the plurality of light-emission surfaces 1221*a*. This may be because the curvature, the formation angle, and the size of each of the plurality of light-emission surfaces 1221*a* may be varied according to the path of the light emitted through each of the light-emission surfaces.

In an embodiment of the present disclosure, a case in which positions of the plurality of light-emission surfaces 1221*a* shift toward the rear side as they go from one side to the other side in the left-right direction will be described by way of example. This configuration is to allow the light-emission portion 1221 to conform with the body contour of the vehicle.

In other words, the lamp module 1000 of the present disclosure may be accommodated in a space defined by a lamp housing and a cover lens coupled to the lamp housing. The plurality of light-emission surfaces 1221*a* may be disposed such that the positions of the plurality of light-emission surfaces 1221*a* regress toward the rear side as the positions are arranged in a direction from one side to the other side in the left-right direction so that the light-emission portion 1221 is formed to conform with the shape of the cover lens, that is, the outer lens constituting a portion of the body contour of the vehicle. The position of each of the plurality of light-emission surfaces 1221*a* may vary according to the shape of the cover lens.

In one example, the guiding member 1220 may guide the light incident on the second light-receiving module 1210*b* to travel from the lower side with respect to the optical axis Ax of the light-emission portion 1221 to the upper side with respect to the optical axis Ax of the light-emission portion 1221 and then to travel in a frontward direction toward the light-emission portion 1221.

The guiding member 1220 may include a lower reflective portion 1222 disposed under the optical axis Ax of the light-emission portion 1221, and an upper reflective portion 1223 disposed on top of the optical axis Ax of the light-emission portion 1221.

The lower reflective portion 1222 may include a first reflective surface 1222*a* that laterally reflects the light incident on the second light-receiving module 1210*b*, and a second reflective surface 1222*b* that upwardly reflects the light laterally reflected from the first reflective surface 1222*a*.

In this regard, the lower reflective portion 1222 may be formed to be symmetrical in the left-right direction with respect to the optical axis Ax of the light-emission portion 1221, and accordingly, the first reflective surface 1222*a* and the second reflective surface 1222*b* may be formed on both opposing sides with respect to the optical axis Ax of the light-emission portion 1221, respectively.

The first reflective surface 1222*a* may be formed to extend along the front-rear direction and to be inclined so that a lateral distance thereof from the optical axis Ax of the light-emission portion 1221 increases as the first reflective surface 1222*a* extends from the rear end to the front end. Thus, the light incident on the second light-receiving module 1210*b* may be laterally reflected from the first reflective surface 1222*a*. The second reflective surface 1222*b* may be disposed on a side of the first reflective surface 1222*a* and may be inclined such that a lateral distance thereof from the optical axis Ax of the light-emission portion 1221 increases as the second reflective surface 1222*b* extends from a lower end to an upper end so that the light reflected laterally from the first reflective surface 1222*a* may be reflected by second reflective surface 1222*b* and proceed upwardly.

The upper reflective portion 1223 may serve to reflect the light reflected upwardly from the second reflective surface 1222*b* toward the frontward direction so that the light is focused on or near the rear focus F of the light-emission portion 1221. As the lower reflective portion 1222 is formed to be symmetrical in the left-right direction with respect to the optical axis Ax of the light-emission portion 1221, the upper reflective portion 1223 may be respectively formed at both opposing sides with respect to the optical axis Ax of the light-emission portion 1221.

In this regard, the upper reflective portion 1223 may be formed to have a curved shape so that the light reflected upwardly from the second reflective surface 1222*b* is concentrated on or near the rear focus F of the light-emission portion 1221. In this case, the light reflected from the lower reflective portion 1222 to the upper reflective portion 1223 may be propagated as parallel light.

As described above, the lower reflective portion 1222 and the upper reflective portion 1223 may be disposed in front of the light-emission portion 1210 so that the light incident on the second light-receiving module 1210*b* is reflected from the lower reflective portion 1222 and the upper reflective portion 1223 so as to proceed to the light-receiving portion 1221.

In one example, the guiding member 1220 may include a shield portion 1224 having a front end disposed at the rear focus F of the light-emission portion 1221. An edge portion E may be formed at the front end of the shield portion 1224 so as to extend in the left-right direction, thereby forming a cut-off line of a beam pattern.

In other words, the edge portion E may serve to form the cut-off line CL of the low beam pattern LP of FIG. 8. In this case, the edge portion E may include an inclined edge E0 for forming the inclined line CL0, a first edge E1 for forming the first line CL1 of the cut-off line CL, and a second edge E2 for forming the second line CL2 of the cut-off line CL.

Figure 12:
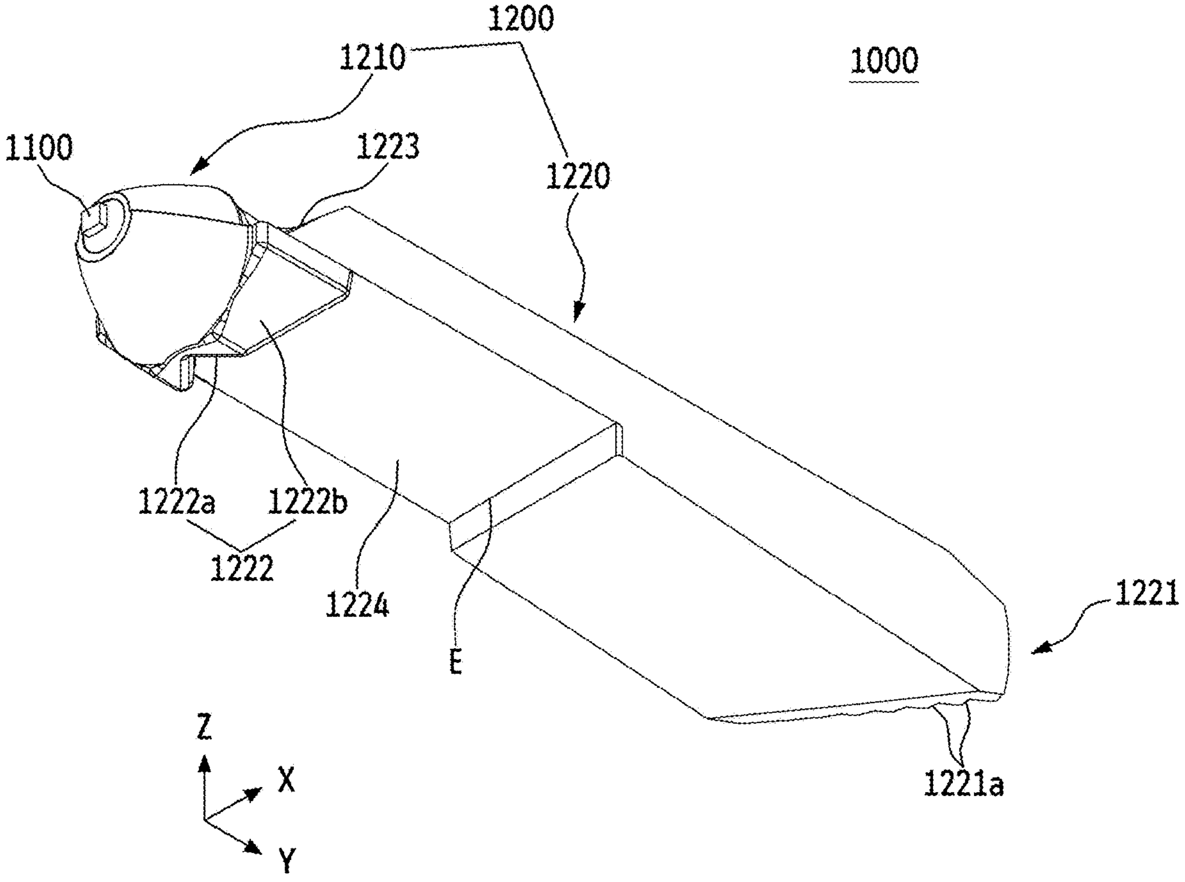
FIG. 12 is a perspective view illustrating an edge portion having no step according to an embodiment of the present disclosure.

In some embodiments of the present disclosure, the inclined edge E0 may be intended for allowing a step to be formed between the first edge E1 and the second edge E2 so that the first line CL1 and the second line CL2 of the cut-off line CL of FIG. 8 as described above are formed at different levels in the vertical direction. However, the present disclosure is not limited thereto. Where the first line CL1 and the second line CL2 of the cut-off line CL of FIG. 8 are intended to be formed as a single flat line with no step, the first edge E1 and the second edge E2 may be formed as a single flat edge having no step defined therebetween as shown in FIG. 12. In this case, the inclined edge E0 may be omitted.

In an exemplary embodiment of the present disclosure, the light incident on the first light-receiving module 1210*a* being focused on or near the rear focus F of the light-emission portion 1221 and the path of the light incident on the second light-receiving module 1210*b* being adjusted by the lower reflective portion 1222 and the upper reflective portion 1223 is intended to prevent the light incident on the second light-receiving module 1210*b* from being blocked by the shield portion 1224 and thus to minimize the light loss.

In other words, even when the light incident on the first light-receiving module 1210*a* is focused on or near the rear focus F of the light-emission portion 1221 by adjusting the curvature or the forming angle of the upper area of each of the central surface 1211, the protruding surface 1212, and the reflective surface 1213 disposed above the optical axis Ax of the light-emission portion 1221, the light incident on the second light-receiving module 1210*b* can avoid being interfered by the shield portion 1224. However, the light incident on the second light-receiving module 1210*b* may be subjected to interference due to the front end of the shield portion 1224 even when the curvature or the forming angle of the lower area of each of the central surface 1211, the protruding surface 1212, and the reflective surface 1213 disposed below the optical axis Ax of the light-emission portion 1221 is adjusted. In this regard, the light that proceeds to the light-emission portion 1221 may be blocked, and thus light loss may occur. To address such an issue, the lower reflective portion 1222 and the upper reflective portion 1223 may be configured to allow the light incident to the second light-receiving module 1210*b* to proceed along a path in which no interference is caused by the shield portion 1224, thereby preventing light loss due to the light blocked for forming the cut-off line CL.

Figure 13:
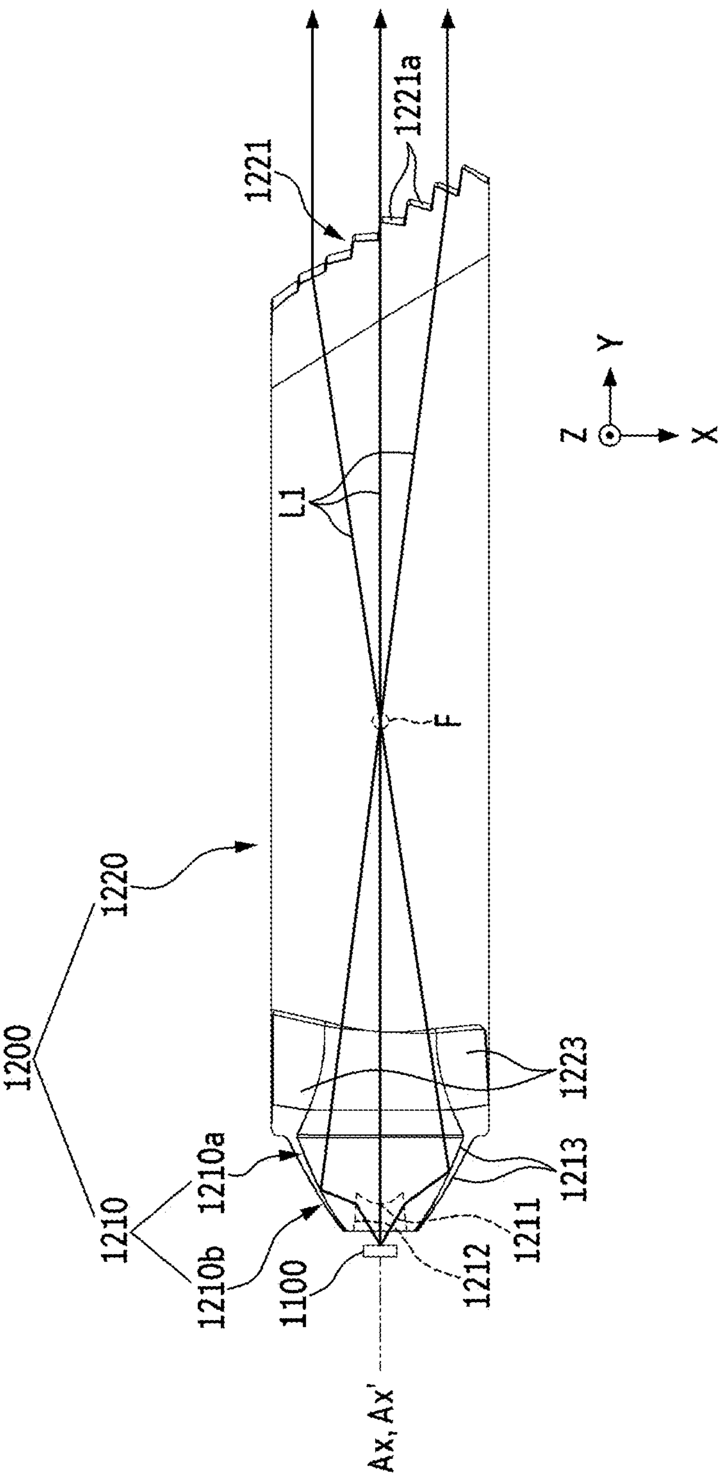
FIGS. 13 and 14 are schematic diagrams illustrating a light path of the light incident on a first light-receiving module according to an embodiment of the present disclosure.
Figure 14:
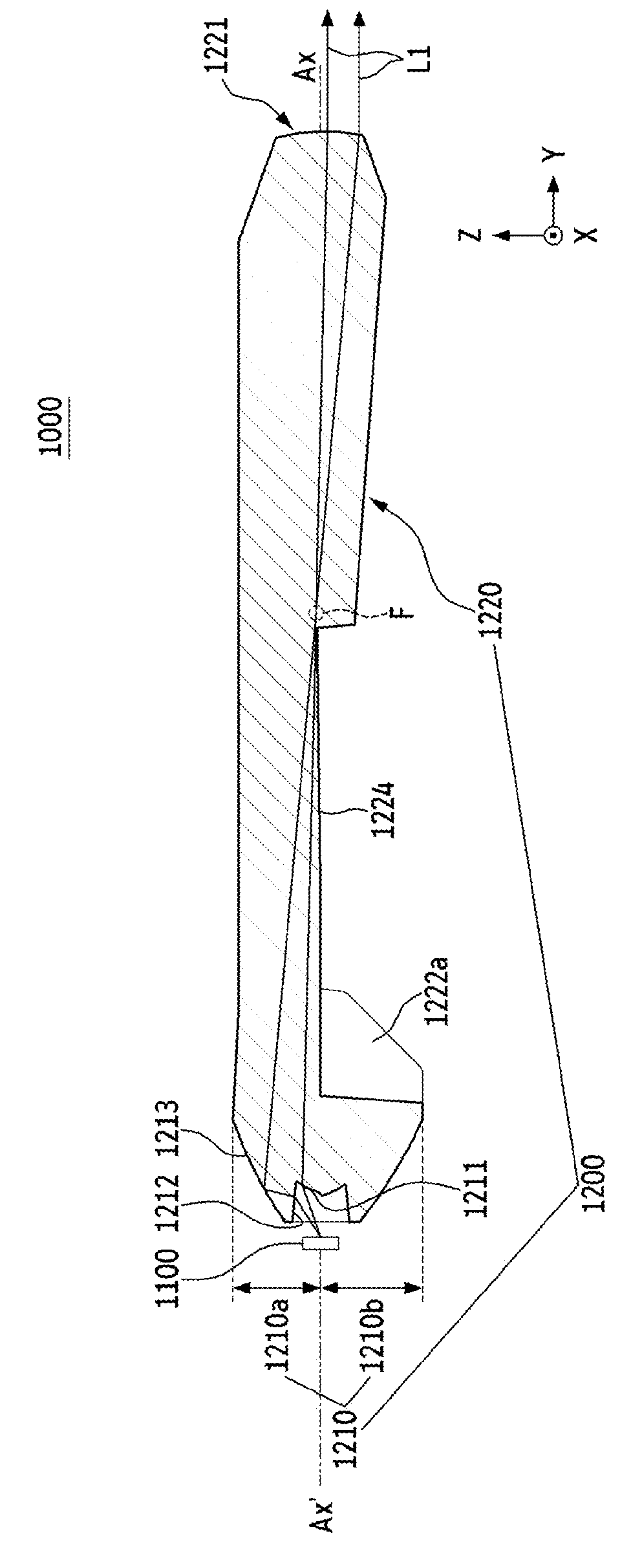

FIGS. 13 and 14 are schematic diagrams illustrating a light path of the light incident on the first light-receiving module according to an embodiment of the present disclosure.

Referring to FIGS. 13 and 14, light L1 incident from the light source 1100 to the first light-receiving module 1210*a* may be guided to be concentrated at or near the rear focus F of the light-emission portion 1221 via the elements of the guiding member 1220 disposed above the optical axis Ax of the light-emission portion 1221 and may be emitted through the light-emission portion 1221.

In other words, the light L1 incident on the first light-receiving module 1210*a* may be focused on or near the rear focus F of the light-emission portion 1221 by configuring the curvature or the formation angle of the elements of each of the central surface 1211, the protruding surface 1212, and the reflective surface 1213 disposed above the optical axis Ax of the light-emission portion 1221.

Figure 15:
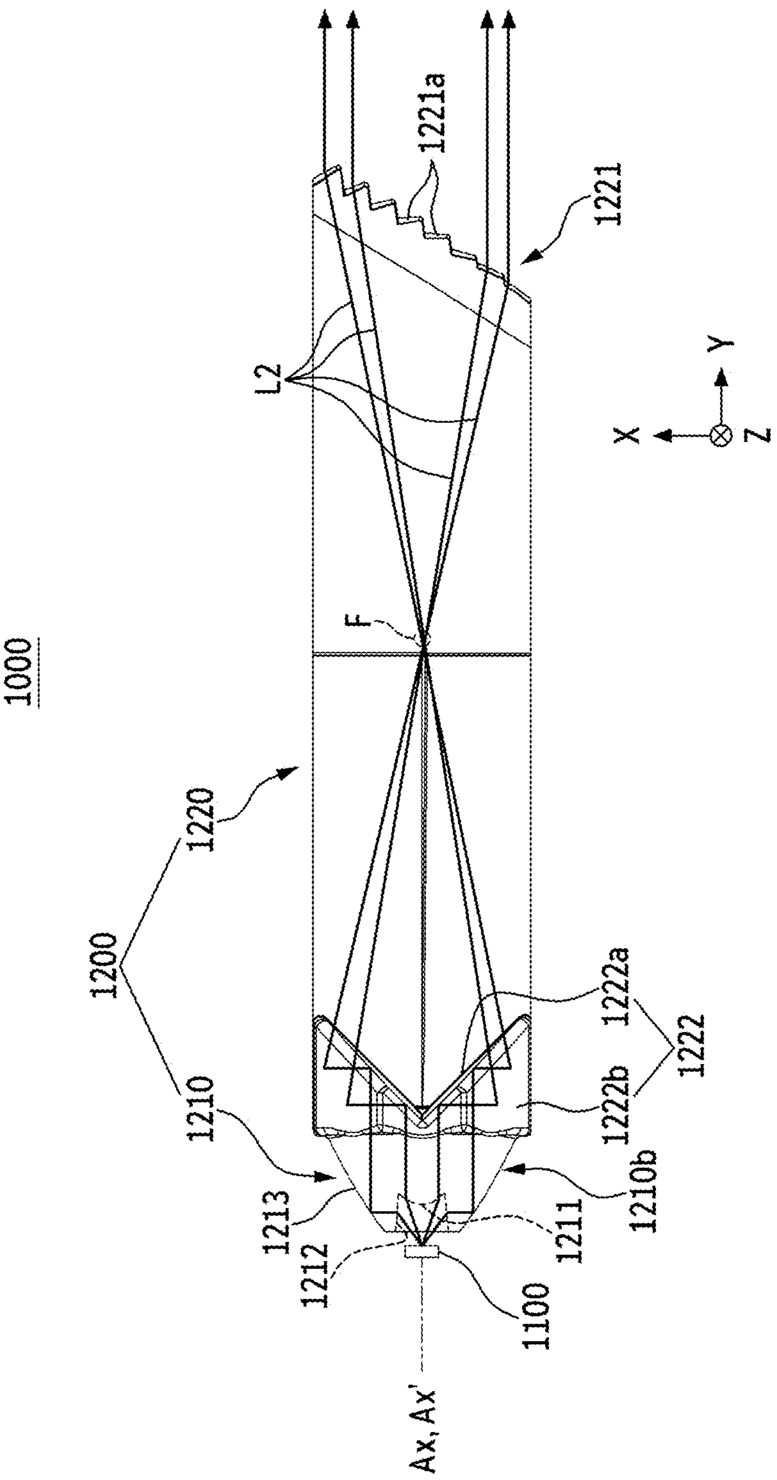
FIGS. 15 and 16 are schematic diagrams illustrating a light path of the light incident on a second light-receiving module according to an embodiment of the present disclosure.
Figure 16:
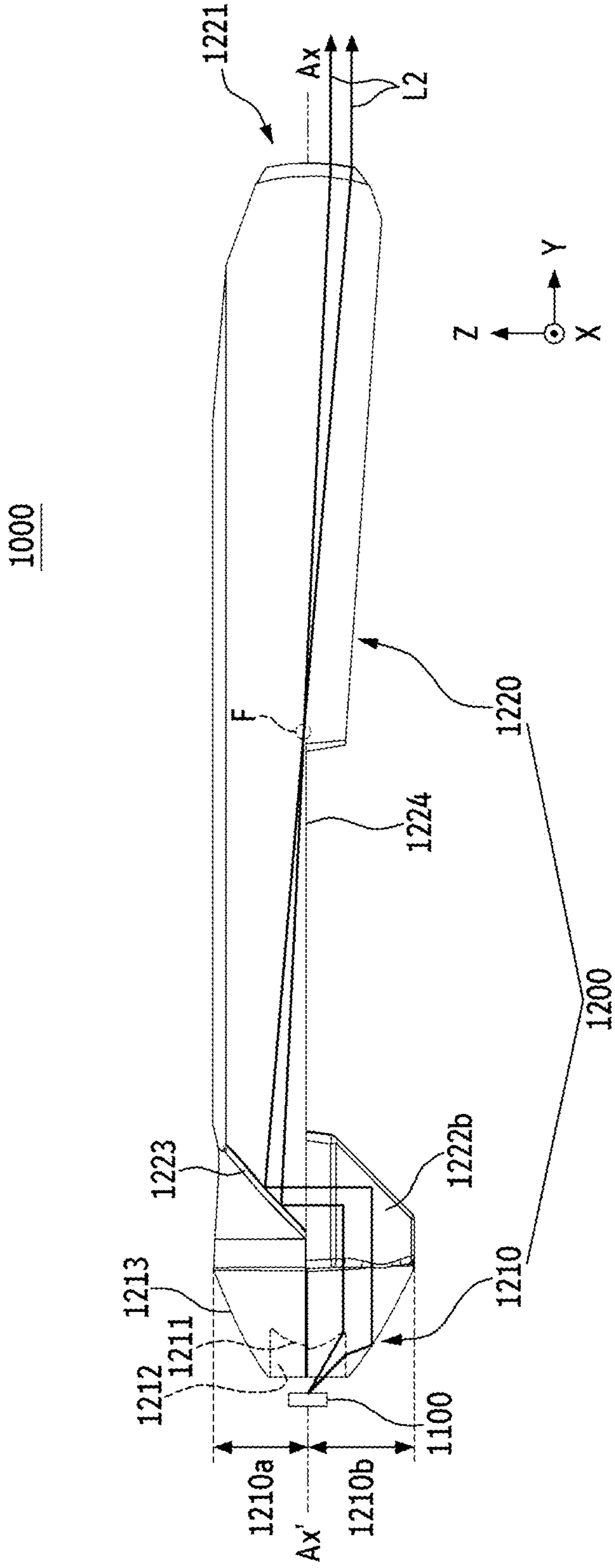

FIGS. 15 and 16 are schematic views illustrating a light path of the light incident on a second light-receiving module according to an embodiment of the present disclosure.

Referring to FIGS. 15 and 16, light L2 incident from the light source 1100 to the second light-receiving module 1210*b* and proceeding as parallel light, which is substantially parallel to the optical axis Ax of the light-emission portion 1221, may be reflected laterally by the first reflective surface 1222*a*. The light reflected laterally from the first reflective surface 1222*a* may be subsequently reflected upwardly by the second reflective surface 1222*b*. The light reflected upwardly from the second reflective surface 1222*b* may be guided by the upper reflective portion 1223 to be concentrated at or near the rear focus F of the light-emission portion 1221, and may be emitted through the light-emission portion 1221.

In FIG. 15, the path of light being reflected upwardly from the second reflective surface 1222*b* is not visible as it is a top view. Similarly, in FIG. 16, the path of light being reflected laterally from the first reflective surface 1222*a* is not visible as it is a side view.

As described above, in the lamp module 1000 according to the present disclosure, when the low beam pattern LP in which light is irradiated to an area under the cut-off line CL is formed, light blocked to form the cut-off line CL may still proceed to and be emitted from the light-emission portion 1221 with a minimal loss, and thus the light loss may be decreased such that the light efficiency may be increased.

In one example, in the above-described embodiment, since the light incident on the first light-receiving module 1210*a* is focused on or near the rear focus F of the light-emission portion 1221 while the light incident on the second light-receiving module 1210*b* proceeds as a light beam substantially parallel to the optical axis Ax of the light-emission portion 1221, each of the first reflective surface 1222*a* and the second reflective surface 1222*b* may be configured in a flat (e.g., planar) shape so that the light incident on the second light-receiving module 1210*b* maintains the parallel light. However, this is merely one example, and the present disclosure is not limited thereto. When the first light-receiving module 1210*a* and the second light-receiving module 1210*b* are formed to be symmetrical to each other to facilitate the injection process, not only the light incident on the first light-receiving module 1210*a* but also the light incident on the second light-receiving module 1210*b* would be concentrated at or near the focus F in rear of the light-emission portion 1221. For this reason, at least one of the first reflective surface 1222*a* or the second reflective surface 1222*b* may be formed to have a curved shape so that the light incident on the second light-receiving module 1210*b* can be converted into parallel light.

Figure 17:
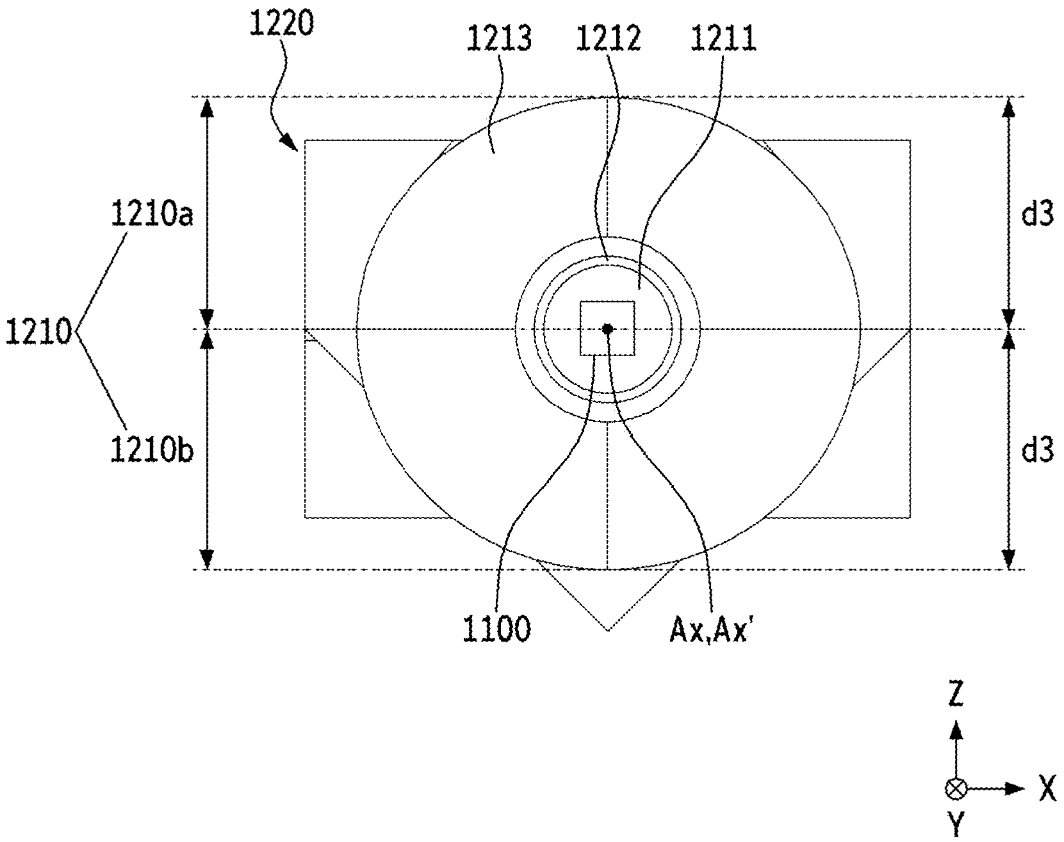
FIG. 17 is a rear view illustrating a light-receiving portion of a light guide according to another embodiment of the present disclosure.
Figure 18:
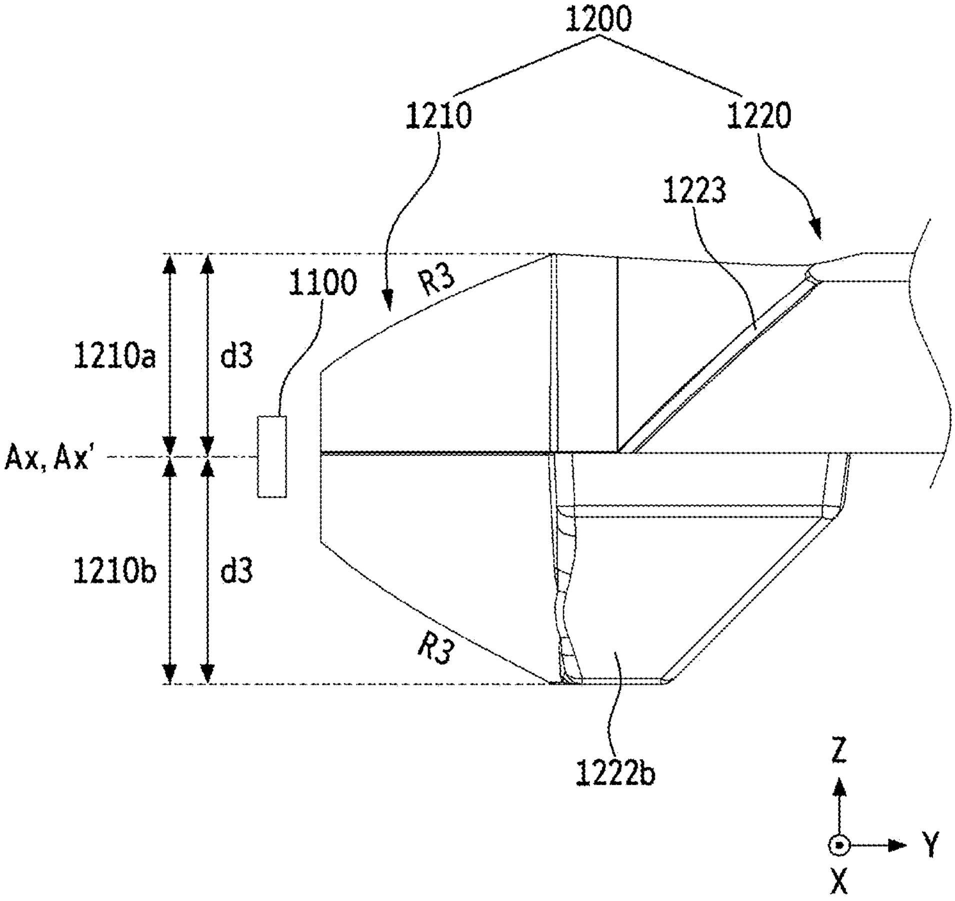
FIG. 18 is a side view illustrating a light-receiving portion of a light guide according to another embodiment of the present disclosure.
Figure 19:
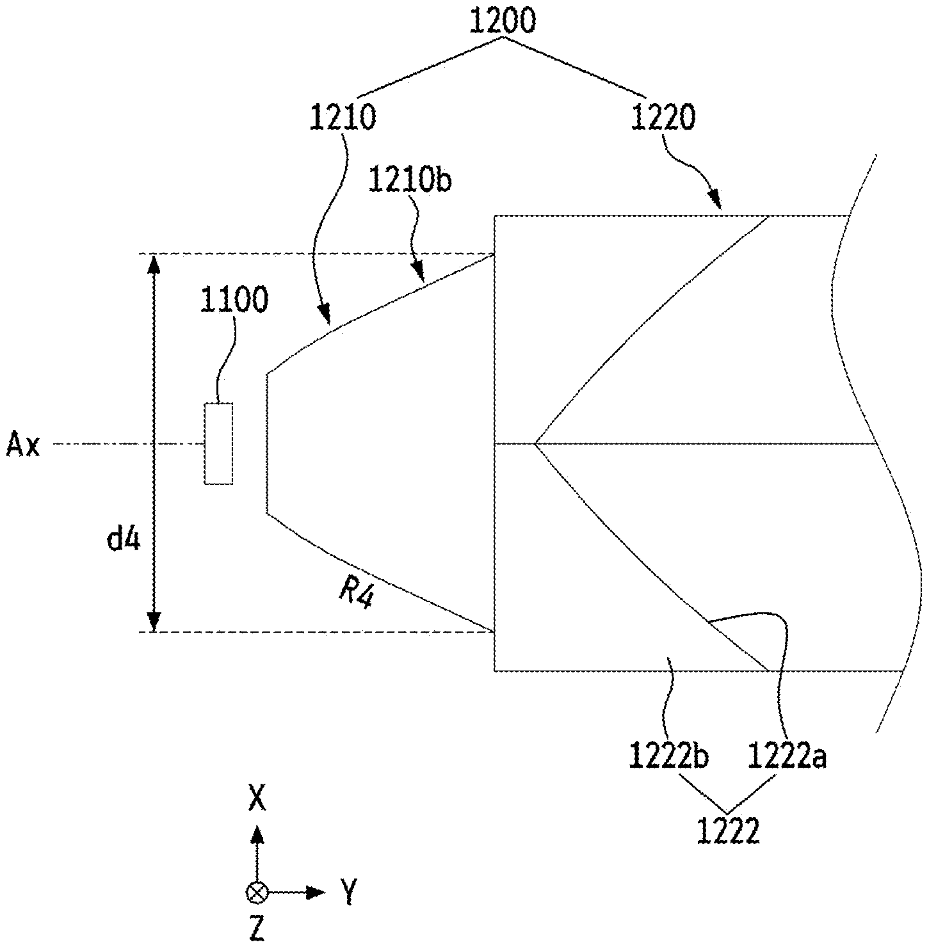
FIG. 19 is a bottom view illustrating a light-receiving portion of a light guide according to another embodiment of the present disclosure.

For example, as shown in FIGS. 17 to 19, where the first light-receiving module 1210*a* and the second light-receiving module 1210*b* of the light-receiving portion 1210 have the same lengths d3 and d4 and the same curvatures R3 and R4 in the vertical and horizontal directions, respectively, the light incident on the second light-receiving module 1210*b* would also be focused on or near the rear focus F1 of the light-emission portion 1221 similar to the light incident on the first light-receiving module 1210*a*. For this reason, at least one of the first reflective surface 1222*a* or the second reflective surface 1222*b* may be formed to have a curved shape. In an embodiment of the present disclosure, a case in which the first reflective surface 1222*a* has a curved shape and the second reflective surface 1222*b* has a flat shape, and thus the light incident on the second light-receiving module 1210*b* is converted into parallel light by the first reflective surface 1222*a* will be described by way of example.

In an embodiment of the present disclosure, at least one of the first reflective surface 1222*a* or the second reflective surface 1222*b* may be formed in a curved shape. This configuration may ensure that the light incident on the second light-receiving module 1210*b* is converted into parallel light. This design stems from the notion that the upper reflective portion 1223, which has a curved shape, concentrates the light reflected from the upper reflective portion 1223 at or near the rear focus F of the light-emission portion 1221. Consequently, the light that proceeds from the lower reflective portion 1222 to the upper reflective portion 1223 may need to be transformed into a parallel light beam.

Figure 20:
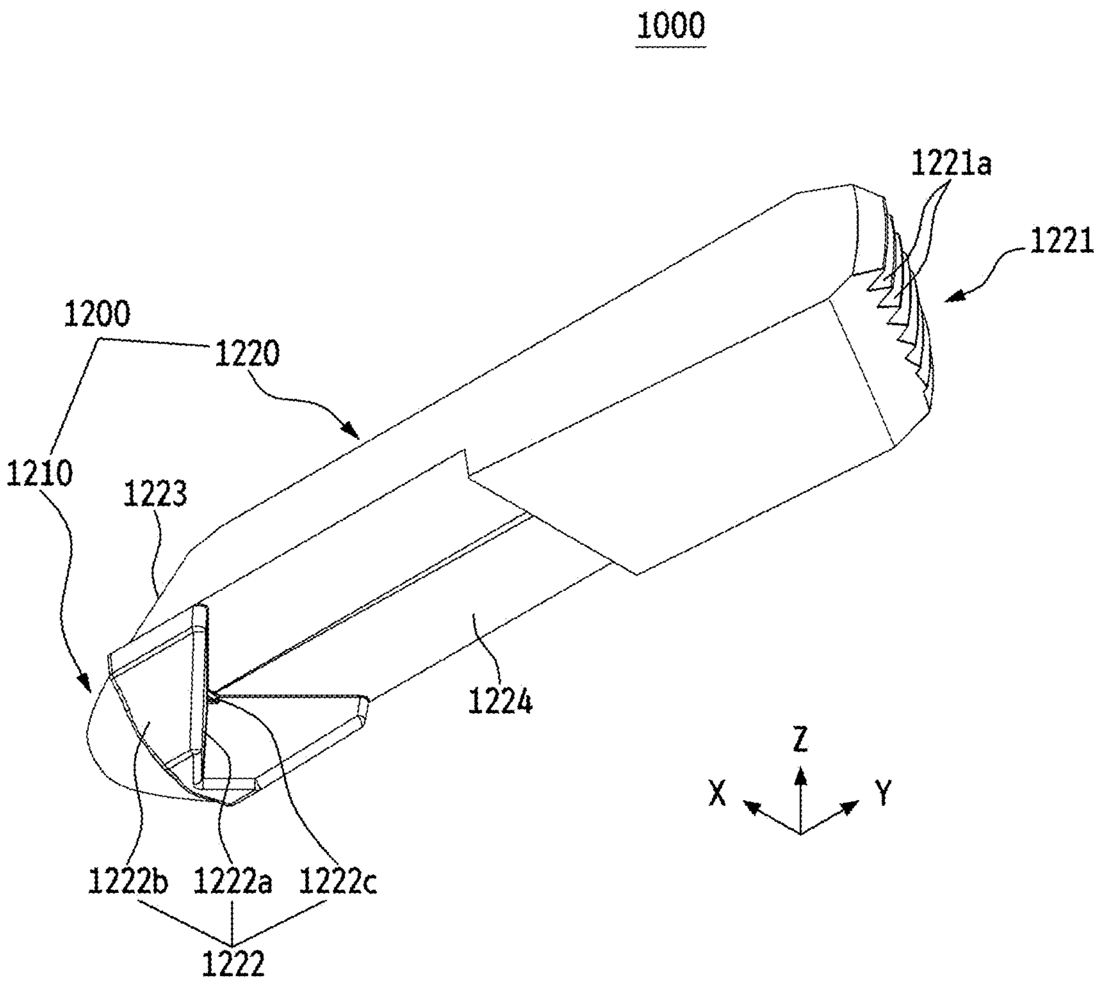
FIG. 20 is a perspective view illustrating a lamp module according to another embodiment of the present disclosure.
Figure 21:
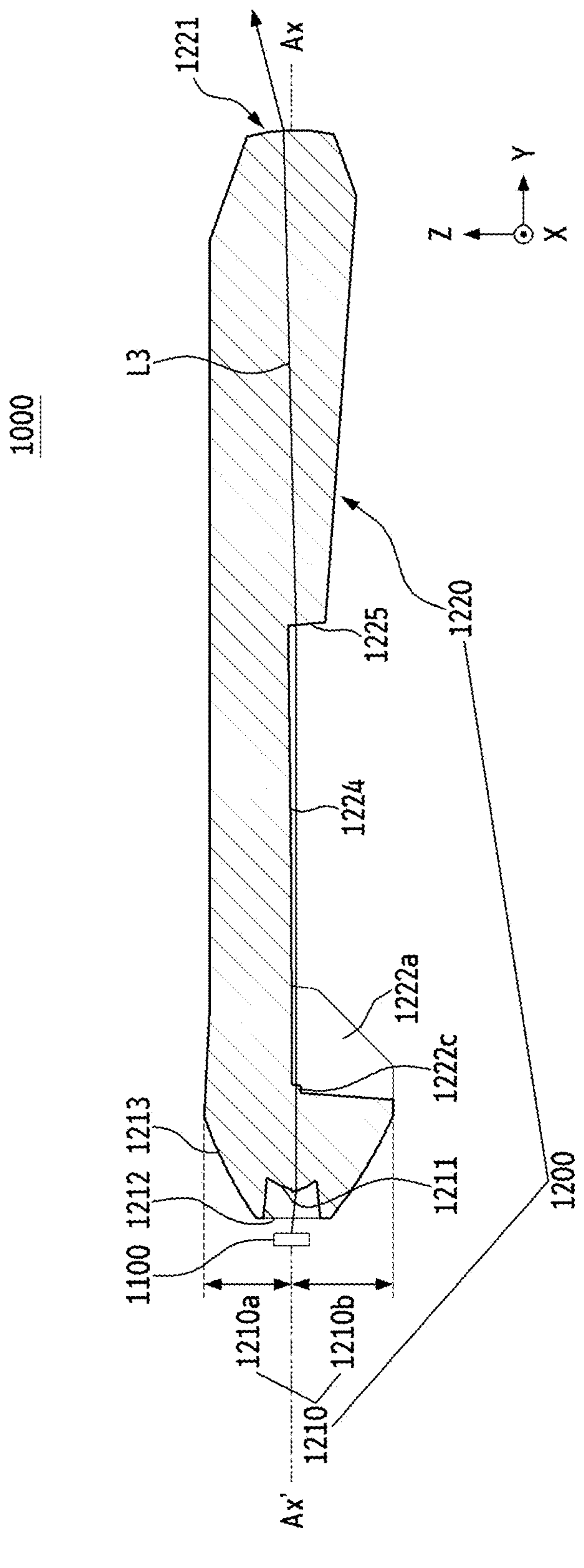
FIG. 21 is a schematic diagram showing an optical path of a lamp module according to another embodiment of the present disclosure.

FIG. 20 is a perspective view illustrating a lamp module according to another embodiment of the present disclosure, and FIG. 21 is a schematic view illustrating an optical path of the lamp module according to another embodiment of the present disclosure.

Referring to FIGS. 20 and 21, in the lamp module 1000 according to another embodiment of the present disclosure, in addition to the first reflective surface 1222*a* and the second reflective surface 1222*b*, the lower reflective portion 1222 may further include a transmission portion 1222*c* through which light transmits.

Figure 22:
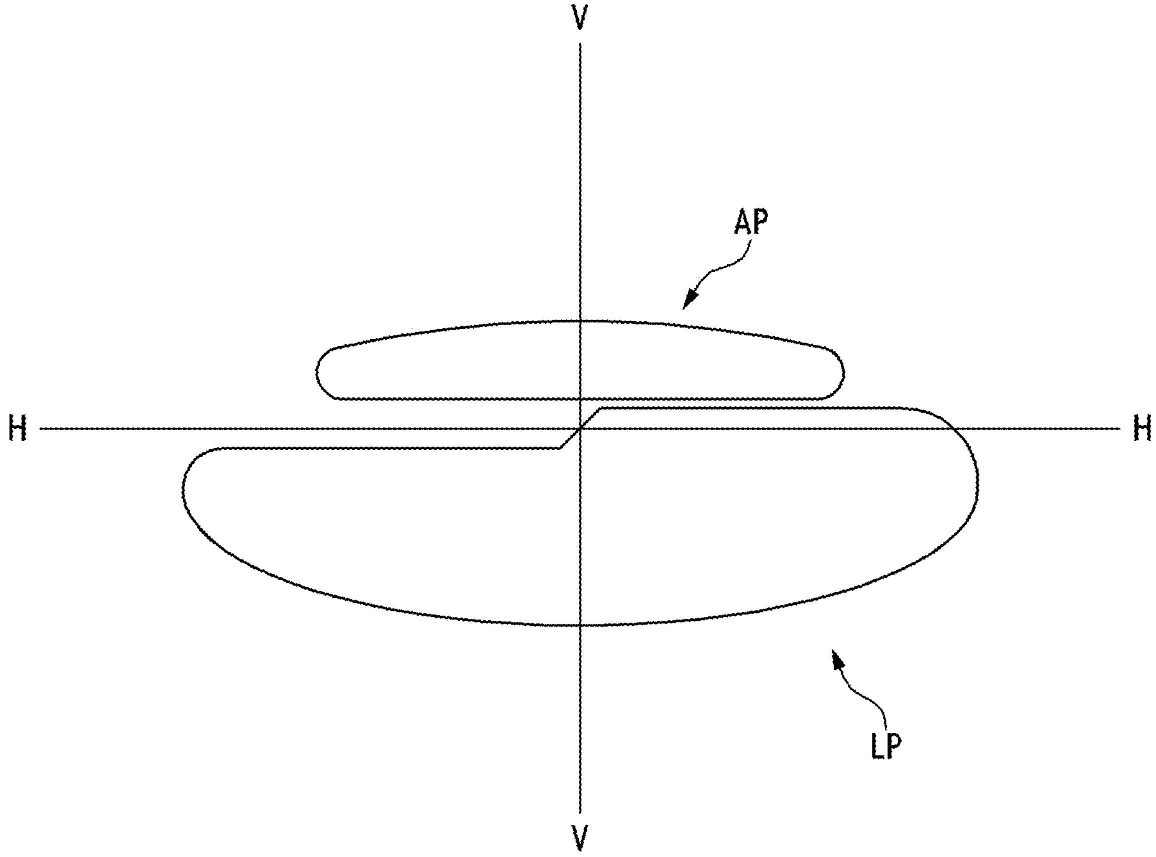
FIG. 22 is a schematic diagram showing an additional beam pattern formed by a lamp module according to another embodiment of the present disclosure.

In other words, in the above-described embodiment, the light incident on the second light-receiving module 1210*b* is entirely reflected from the lower reflective portion 1222 to the upper reflective portion 1223. In the another embodiment of the present disclosure, a portion L3 of the light incident on the second light-receiving module 1210*b* may be transmitted through the transmission portion 1222*c*, and may proceed. The light L3 that has passed through the transmission portion 1222*c* may proceed to the light-emission portion 1221 through a connection surface 1225 that connects the front end of the shield portion 1224 and the lower surface of the guiding member 1220 to each other. Thus, the lamp module 1000 of the present disclosure may simultaneously form an additional beam pattern AP together with the low beam pattern LP as shown in FIG. 22.

In another embodiment of the present disclosure, since the light L3 that proceeds to the light-emission portion 1221 through the transmission portion 1222*c* and the connection surface 1225 passes below the rear focus F of the light-emission portion 1221 and proceeds to the light-emission portion 1221, the light may be refracted in a relatively upward direction when being emitted through the light-emission portion 1221. Thus, a signal beam pattern that enables easier identification of a road sign or the like disposed above the driver's view-point may be formed as the additional beam pattern AP. The signal beam pattern is merely one example for the additional beam pattern AP, and the present disclosure is not limited thereto. Depending on a formation angle of at least one of the transmission portion 122*c* or the connection surface 125, the light distribution characteristics of the additional beam pattern AP may be variously changed.

As described above, since the lower reflective portion 1222 includes the transmission portion 1222*c*, an optical system for forming the low beam pattern LP and the additional beam pattern AP, that is, the light source 1100 and the light guide 1200 may be commonly used. Thus, different optical systems for forming different beam patterns are not necessary, which provides advantages that a configuration may be simplified, and a cost may be reduced.

Figure 23:
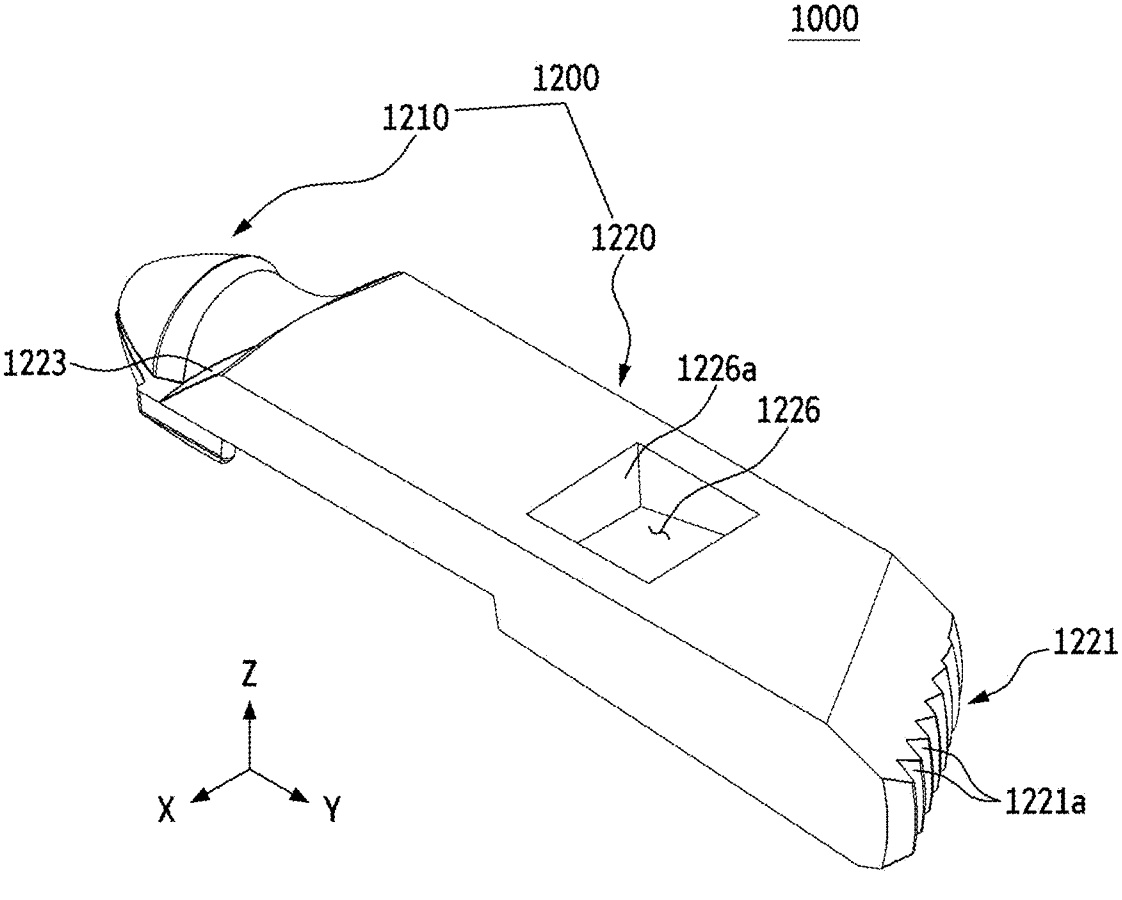
FIGS. 23 and 24 are perspective views of a lamp module according to another embodiment of the present disclosure.
Figure 24:
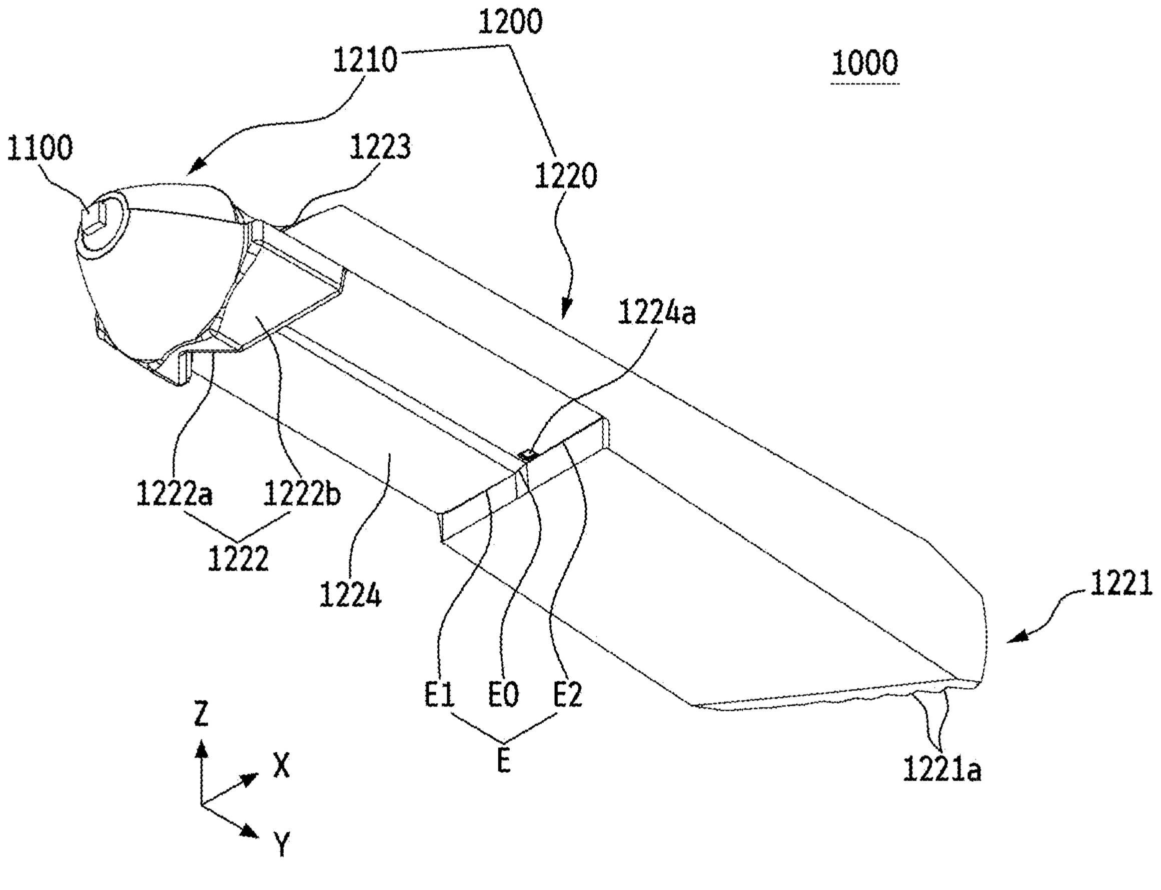
Figure 25:
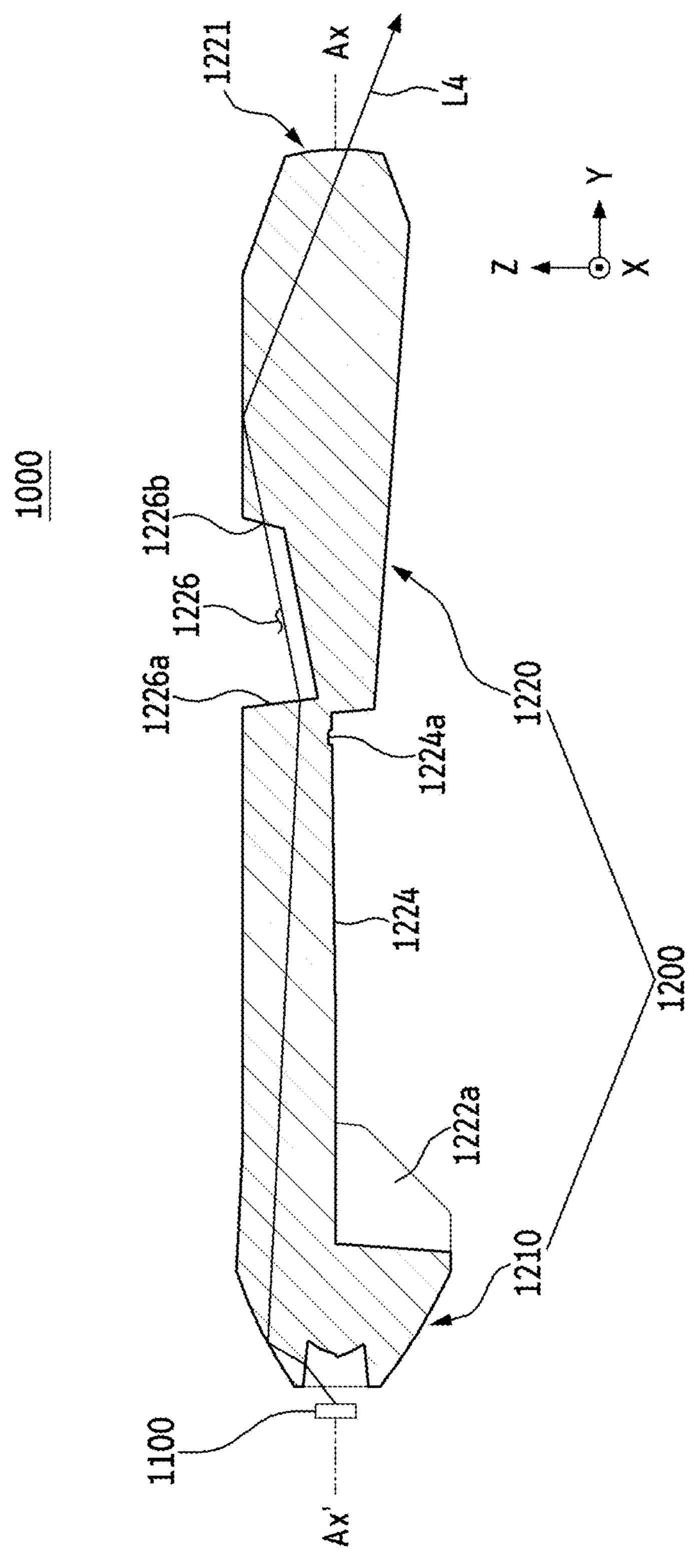
FIG. 25 is a schematic diagram showing an optical path of a lamp module according to another embodiment of the present disclosure.

FIGS. 23 and 24 are perspective views of a lamp module according to still another embodiment of the present disclosure is illustrated, and FIG. 25 is a schematic view illustrating an optical path of the lamp module according to still another embodiment of the present disclosure.

Referring to FIGS. 23 to 25, in the lamp module 1000 according to still another embodiment of the present disclosure, a concave portion 1226 may be formed in the upper surface of the guiding member 1220, and a shield groove 1224*a* may be formed behind the edge portion E of the shield portion 1224.

Figure 26:
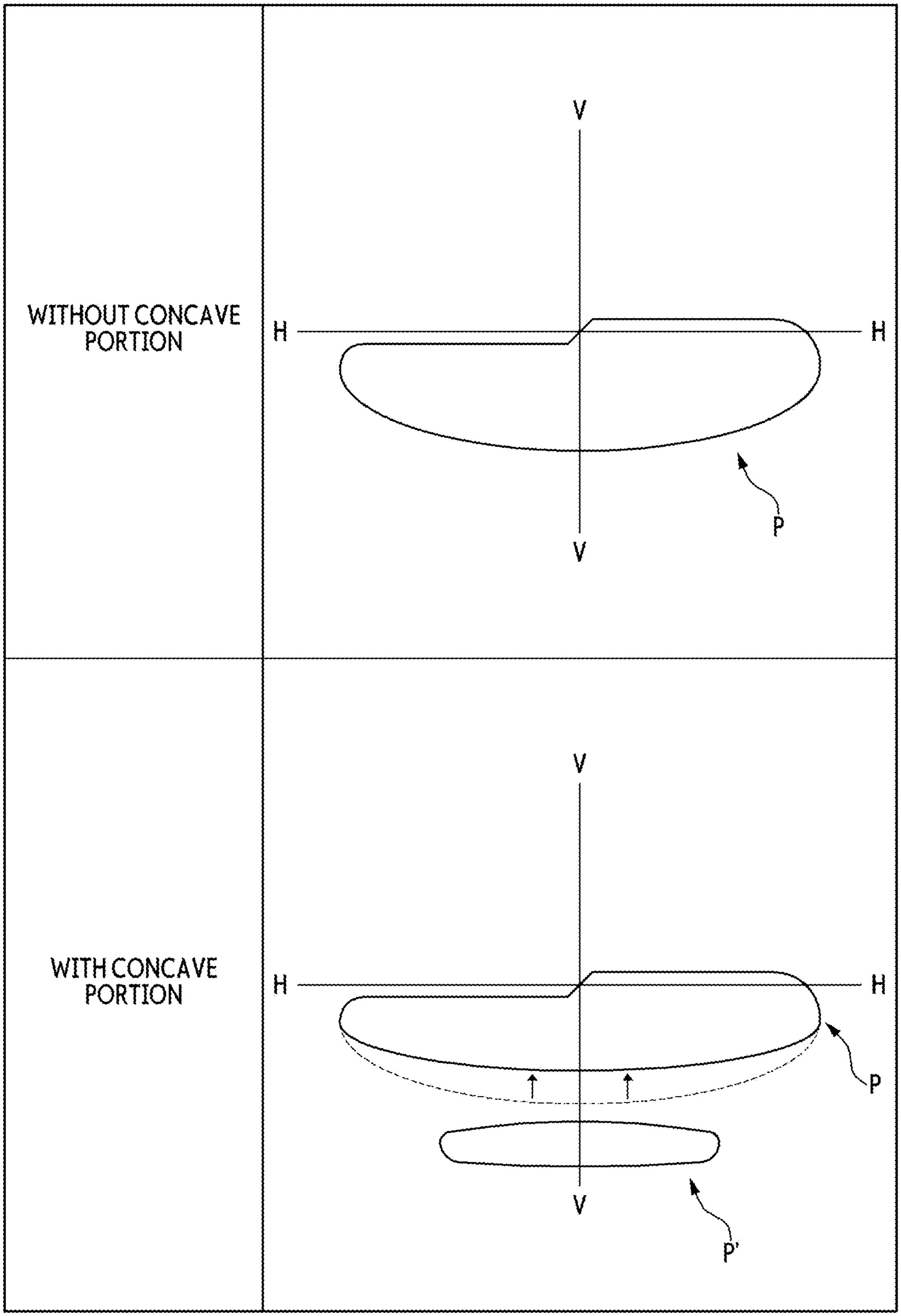
FIG. 26 is a schematic view illustrating a light distribution pattern by a concave portion according to still another embodiment of the present disclosure.

The concave portion 1226 may be constructed to allow the beam pattern formed by the lamp module 1000 of the present disclosure to have a brightness distribution that satisfies the light distribution regulation. The concave portion 1226 may be constructed to adjust a path of partial light L4 that passes above the rear focus F of the light-emission portion 1221, among the light incident on the light-emission portion 1210 and traveling toward the light-emission portion 1221, so that a lower boundary line of the light distribution pattern P formed by the lamp module 1000 of the present disclosure is shifted upwardly as shown in FIG. 26, thereby preventing the region having a set brightness or greater from being directed excessively downwardly.

In this regard, since the light L4 whose path is adjusted by the concave portion 1226 may cause light loss, the formation angle or curvature of at least one of a rear surface 1226*a* and a front surface 1226*b* of the concave portion 1226 may be adjusted so that the light L4 whose path is adjusted by the concave portion 1226 is irradiated to a spread area SA' to be described later so as to be irradiated to an additional region P' in addition to the lower area of the low beam pattern LP. Thus, the light loss may be reduced to improve light efficiency while improving the field of view of the short distance in front of the vehicle.

For example, when two or more lamp modules 1000 of the present disclosure are present, and one of the two or more lamp modules forms a light distribution pattern corresponding to a high illuminance area, and the concave portion 1226 is formed, the light whose path is adjusted by the concave portion 1226 may be added to the lower region of the light distribution pattern corresponding to the spread area, which is formed by another of the two or more lamp modules, thereby improving a short-range field of view.

Figure 27:
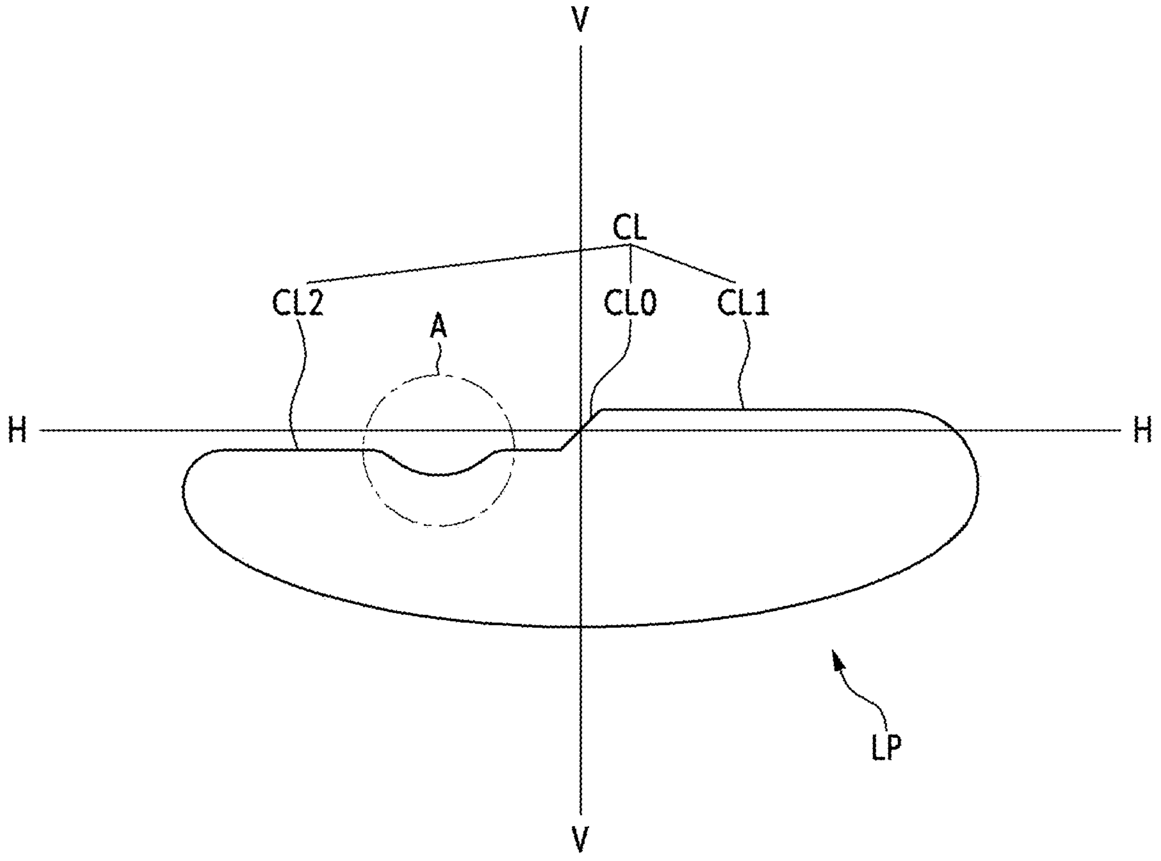
FIG. 27 is a schematic view showing a cut-off line by a shield groove according to still another embodiment of the present disclosure.

In one example, the shield groove 1224*a* may serve to cause a portion of the cut-off line A corresponding to the opposite lane to be depressed downwardly as shown in FIG. 27 to prevent the glare toward the driver of the on-coming vehicle.

In the still another embodiment of the present disclosure, the case in which the concave portion 1226 and the shield groove 1224*a* are formed together is described by way of example, However, this is merely an example for helping understanding of the present disclosure, and the present disclosure is not limited thereto. Any one of the concave portion 1226 or the shield groove 1224*a* may be formed independent of each other.

Figure 28:
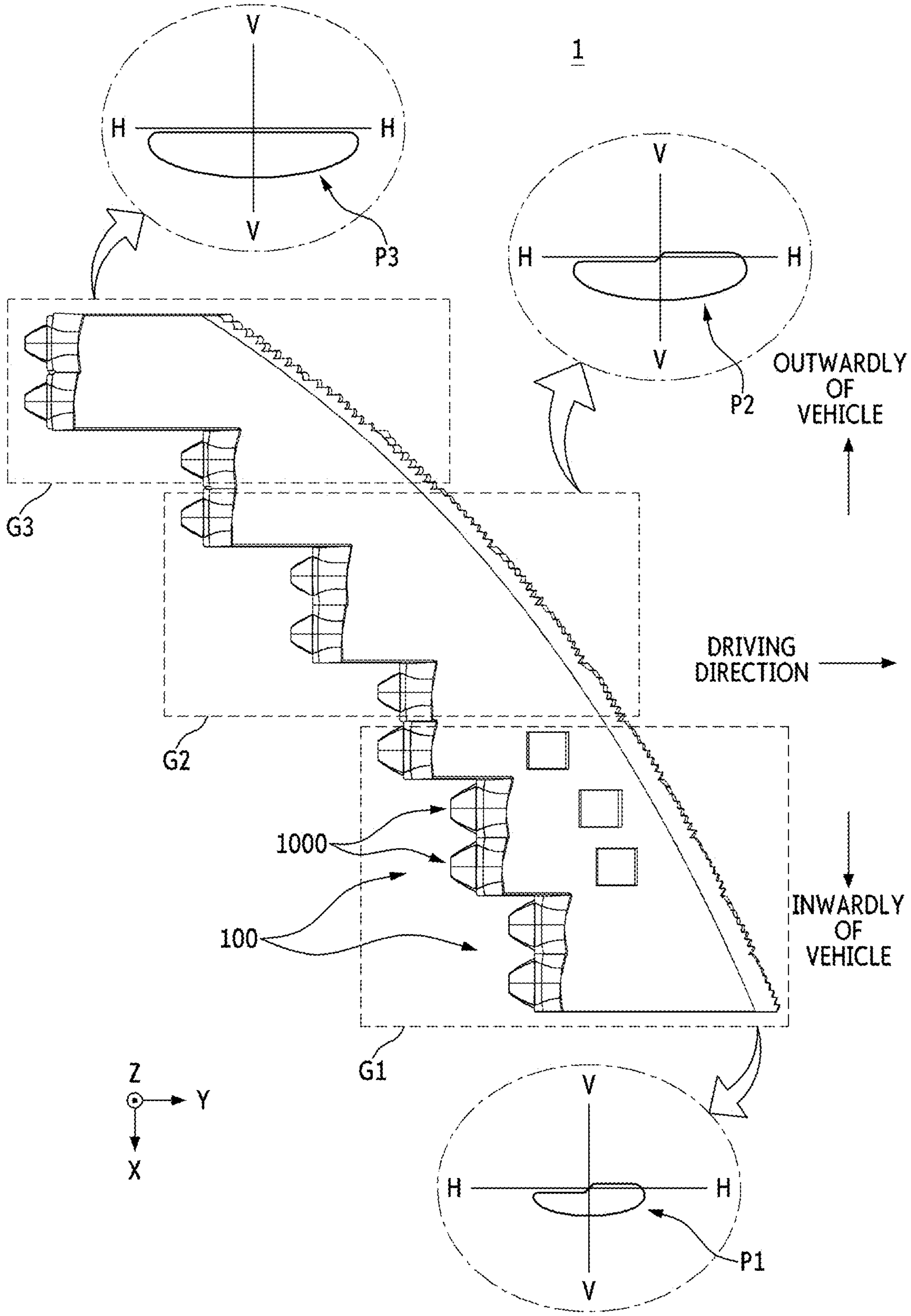
FIG. 28 is a plan view showing a vehicle lamp according to an embodiment of the present disclosure.

FIG. 28 is a plan view showing a vehicle lamp according to an embodiment of the present disclosure. Referring to FIG. 28, a lamp 1 for a vehicle according to an embodiment of the present disclosure may include a plurality of lamp units 100 arranged in the left-right direction.

In this regard, FIG. 28 is an example of a head lamp installed on the left side (e.g., the driver side) of the front portion of the vehicle. It may be appreciated that the installation direction or position of the vehicle lamp 1 of the present disclosure may be appropriately changed. Thus, the vehicle lamp 1 may be installed on the right side of the front portion of the vehicle. The right lamp may be understood to be implemented substantially a mirror image of the left lamp shown in FIG. 28.

Each of the plurality of lamp units 100 may include at least one lamp module 1000. In an embodiment of the present disclosure, a case in which respective at least one lamp modules 1000 of the plurality of lamp units 100 are integrally formed with one another will be described by way of example. In this case, it may be appreciated that the plurality of lamp units 100 are integrally formed with one another.

In addition, in an embodiment of the present disclosure, respective at least one lamp modules 1000 of the plurality of lamp units 100 being integrally formed with one another may mean that the light guide 1200 of the at least one lamp module 1000 is integrally formed with one another.

In an embodiment of the present disclosure, a case in which each of the plurality of lamp units 100 includes two lamp modules 1000 arranged in the left-right direction will be described by way of example. However, the present disclosure is not limited thereto, and the number of lamp modules included in each of the plurality of lamp units 100 may be variously adjusted depending on the light distribution characteristics of a beam pattern to be formed by the lamp 1 for a vehicle of the present disclosure. In this regard, at least one lamp module 1000 included in each of the plurality of lamp units 100 may be implemented with one of the lamp modules of the above-described embodiments.

When at least one of the plurality of lamp units 100 includes the plurality of lamp modules 1000 arranged in the left-right direction, the respective guiding members 1220 of the plurality of lamp modules 1000 may be integrally formed with one another to form a single light-receiving surface. The respective light-receiving portions 1210 of the plurality of lamp modules 1000 may be spaced apart from one another by a predetermined spacing to prevent optical interference between light beams.

Since the lamp 1 for a vehicle according to the present disclosure includes a plurality of lamp units 100, and each of the plurality of lamp units 100 includes at least one lamp module 1000, it may be appreciated that the lamp 1 for a vehicle according to the present disclosure may generate the beam pattern, which is formed collectively by the plurality of lamp modules 1000.

The plurality of lamp units 100 may be disposed in a stepwise manner such that the positions thereof are closer to the rear side (e.g., shift or regress rearward) as the positions thereof are arranged in a direction outwardly of the vehicle (i.e., toward the left side for the left lamp). This configuration is to allow the plurality of lamp units 100 to be arranged along the body line of the vehicle in a similar manner as the light-emission portion 1221 of the lamp module 1000 described above.

The plurality of lamp modules 1000 included in the lamp 1 for a vehicle may be divided into a plurality of groups G1, G2, and G3 for forming different areas of the low beam pattern LP. In an embodiment of the present disclosure, the groups G1, G2, and G3 may be arranged in the left-right direction and in a direction from the inner side of the vehicle toward the outer side. The first group G1 composed of five lamp modules may form a first light distribution pattern P1 corresponding to the high illuminance area, which has a relatively high brightness in order to secure a sufficiently long viewing distance. The second group G2 composed of the next four lamp modules may form a second light distribution pattern P2 corresponding to a middle area, which is wider than the high illuminance area. The third group G3 composed of the next three lamp modules may form a third light distribution pattern P3 corresponding to a spread area for securing a sufficiently wide viewing range. This designation is merely one example which will be described herein. In this regard, the first to third light distribution patterns P1, P2, and P3 may be combined (e.g., superimposed) with one another to collectively form the above-described low beam pattern LP of FIG. 8.

The configuration that the lamp 1 for a vehicle according to the present disclosure is divided into the three groups G1, G2, and G3 is merely an example for helping understanding of the present disclosure, and the present disclosure is not limited thereto. The lamp 1 for a vehicle according to the present disclosure may be configured to have at least one group depending on a light distribution pattern required to form a beam pattern suitable for the use of the lamp 1 for a vehicle according to the present disclosure.

In this regard, the configuration of the plurality of light-emission surfaces 1221*a* for the respective the light-emission portion 1221 of each of the plurality of lamp modules 1000 may be varied depending on the illumination zones to be formed by each of the plurality of lamp modules 1000.

When the cut-off line CL in which the first line CL1 is above the second line CL2 is formed using each of the first group G1 and the second group G2, a glare may be caused due to the light irradiated above the second line CL2, which has a relatively lower vertical level. Thus, the glare may be generated by a side surface 1221*a*' between adjacent light-emission surfaces among the plurality of light-emission surfaces 1221*a*.

Figure 29:
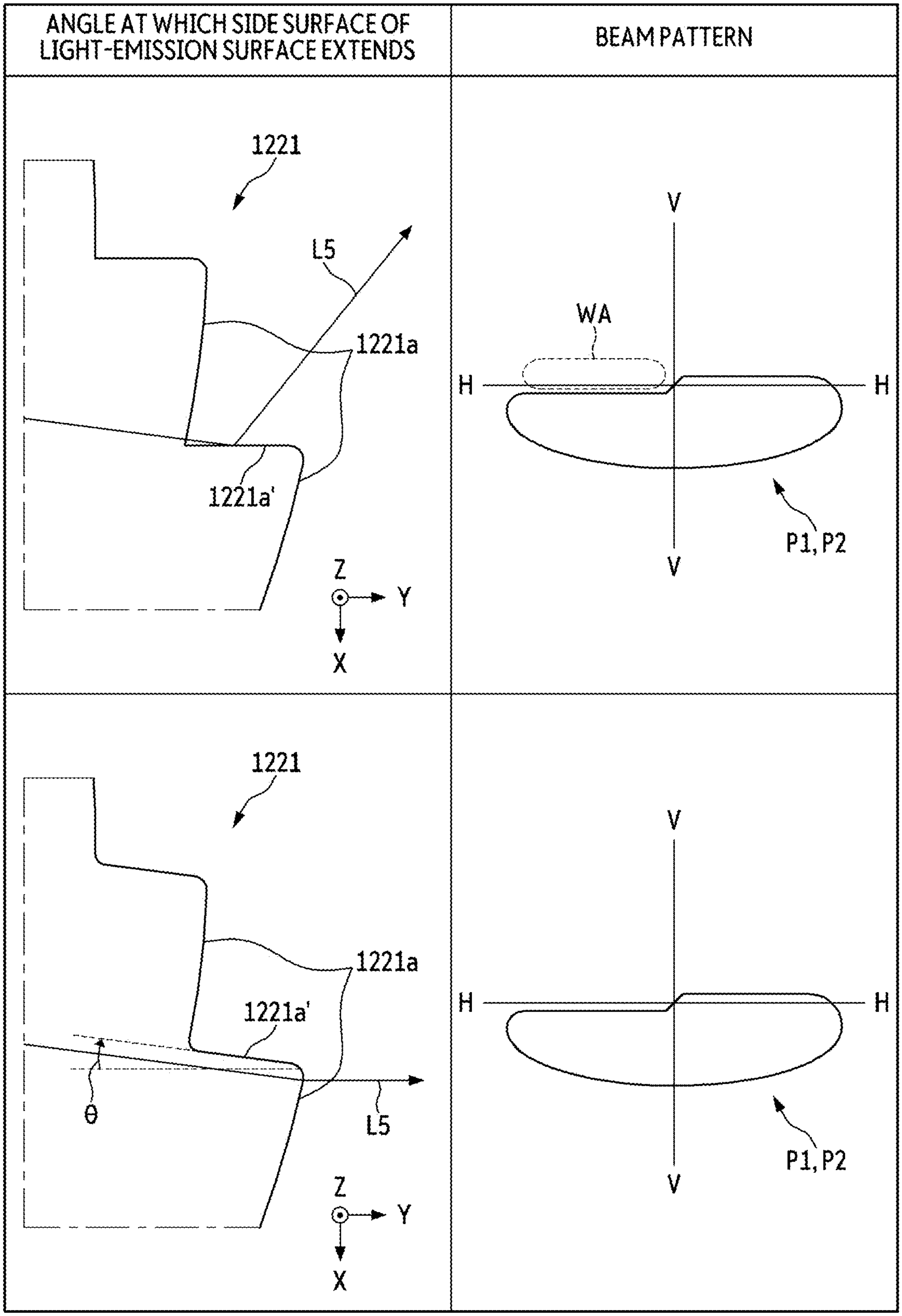
FIG. 29 is a schematic view showing a light distribution pattern corresponding to shapes of a plurality of light-emission surfaces according to an embodiment of the present disclosure.

As shown in FIG. 29, the side surface 1221*a*' of a front light-emission surface 1221*a* among the light-emission surfaces adjacent to each other in the left-right direction may be formed to be inclined outwardly so that a rear end thereof is disposed more outwardly of the vehicle compared to a front end thereof. Due to this configuration, when light L5 emitted toward the side surface 1221*a*' from the rear light-emission surface among the light-emission surfaces adjacent to each other is reflected in the opposite direction by the side surface 1221*a*', the light may be irradiated to an area WA above the second line CL2, thereby generating the glare. For this reason, the side surfaces 1221*a*' of the front light-emission surface 1221*a* among the light-emission surfaces 1221*a* adjacent to each other in the left-right direction may be inclined outwardly at a predetermined angle θ, such that the light emitted to the rear light-emission surface among the light-emission surfaces adjacent to each other is emitted through the inside of the guiding member 1220 toward and through the front light-emission surface among the light-emission surfaces adjacent to each other, thereby preventing the glare from being generated.

If the front end and the rear end of the side surface 1221*a*' between the adjacent light-emission surfaces 1221*a* are arranged in parallel to the front-rear direction, the light emitted from the rear light-emission surface among the adjacent light-emission surfaces may still be reflected in the opposite direction by the side surface 1221*a*' between the adjacent light-emission surfaces 1221*a* to generate the glare. To address such an issue, the side surface 1221*a*' between the adjacent light-emission surfaces 1221*a* may be formed to be inclined such that the rear end of the side surface 1221*a*' between the adjacent light-emission surfaces 1221*a* may be disposed more outwardly compared to the front end thereof.

In some embodiments, the lamp module belonging to the third group G3 may be configured that the edge portion E is formed as a single edge having no step. This edge portion E may correspond to the second line CL2.

In this regard, a wider field of view may be secured as the spread area is spread more in the left-right direction. Accordingly, as shown in FIG. 30, the side surface 1221*a*' of the front light-emission surface among the light-emission surfaces adjacent to each other may be formed to be inclined inwardly such that it is oriented more inwardly toward the centerline of the vehicle as the side surface extends from front to back.

Figure 30:
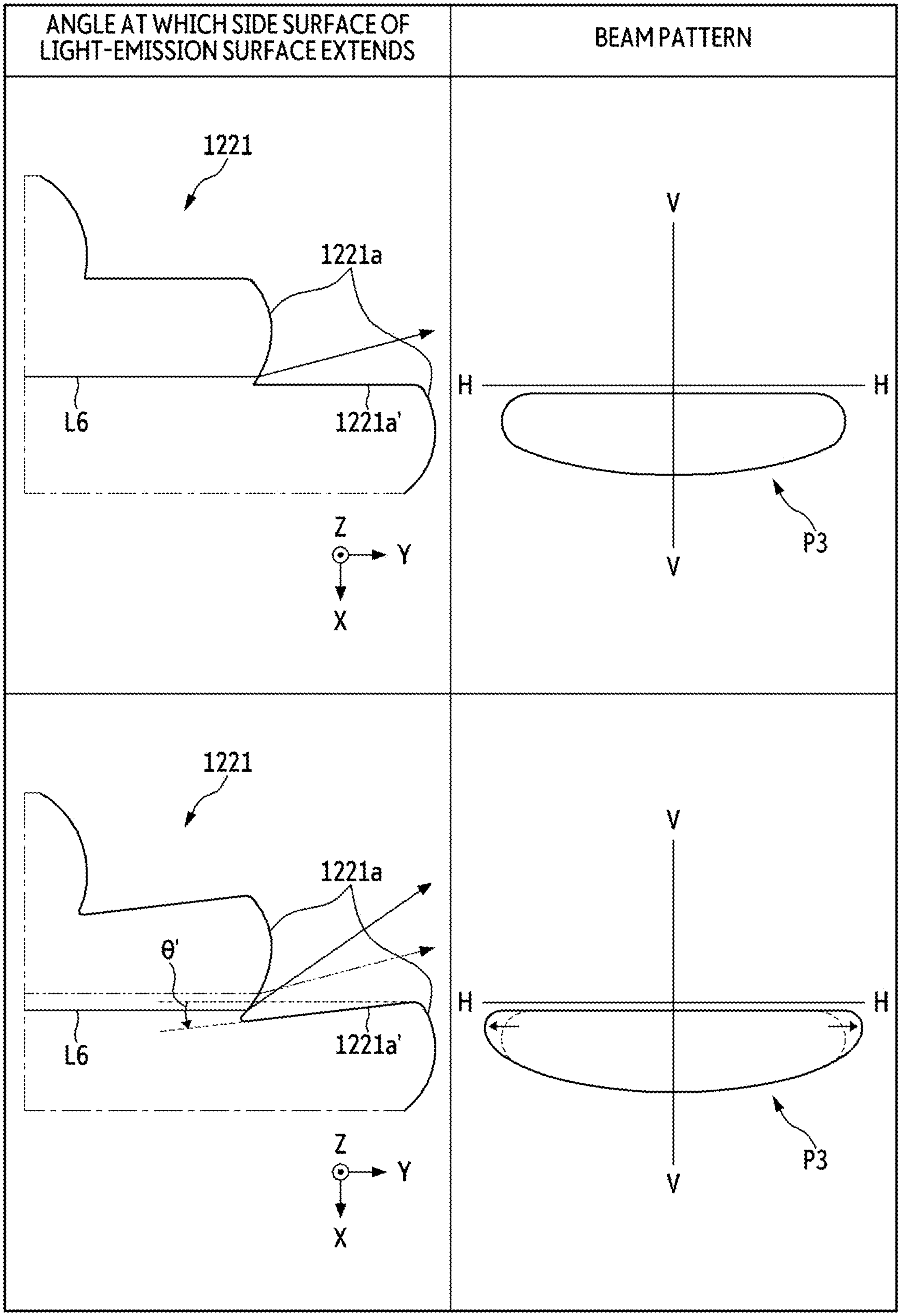
FIG. 30 is a schematic view illustrating a light distribution pattern corresponding to shapes of a plurality of light-emission surfaces according to another embodiment of the present disclosure.

In other words, as shown in FIG. 30, light L6 emitted from each of the plurality of light-emission surfaces 1221*a* may be refracted more in the direction toward the center of the light-emission surface as the light L6 is emitted from a point spaced apart from the center of the light-emission surface in the left-right direction by a greater spacing. Thus, when the side surface 1221*a*' of the front light-emission surface among the light-emission surfaces 1221*a* adjacent to each other in the left-right direction is formed to be inclined at a predetermined angle θ' inwardly so that it is inclined more inwardly toward the centerline of the vehicle as the side surface extends from front to back, the rear light-emission surface among the light-emission surfaces 1221*a* adjacent to each other in the left-right direction may further extend in the left-right direction. Accordingly, the light emitted from the further extended portion may be emitted in a further refracted manner toward the center of the emission surface, such that the spread area is widened. Consequently, the width of the beam pattern formed by the vehicle lamp 1 of the present disclosure may be increased.

In this regard, a dash-double dotted line arrows in FIG. 30 indicates the optical path when the front end and the rear end of the side surface 1221*a*' of the front light-emission surface 1221*a* among the light-emission surfaces 1221*a* adjacent to each other in the left-right direction are arranged in parallel in the front-rear direction.

As described above, in the lamp 1 for a vehicle according to the present disclosure, the shape of the light-emission portion 1221 of each of the plurality of lamp modules 1000, that is, the curvature, formation angle, size, or the like of each of the plurality of light-emission surfaces 1221*a* may be adjusted according to the light distribution pattern to be formed by each of the plurality of lamp modules 1000, so that an optimal beam pattern is formed.

As described above, the lamp module of the present disclosure and the vehicle lamp including the same may reduce light loss due to the light blocked when the cut-off line CL of the low beam pattern LP is formed, thereby improving light efficiency. Since the beam pattern is formed by the plurality of lamp modules arranged in the left-right direction, a slimmer form factor may be achieved. Further, the shape of each of the plurality of light-emission surfaces 1221*a* of the light-emission portion 1221 can be adjusted to form an optimal beam pattern.

In concluding the detailed description, those skilled in the art will appreciate that variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp module comprising:
a light source that generates light; and
a light guide for guiding the light incident thereto from the light source to be emitted,
wherein the light guide includes:
a light-receiving portion to which the light is incident from the light source;
a light-emission portion from which the light is emitted; and
a guiding member that allows at least a portion of the light incident on the light-receiving portion to be transmitted to the light-emission portion and emitted from the light-emission portion to form a predetermined beam pattern,
wherein the guiding member includes:
a lower reflective portion that is disposed under an optical axis of the light-emission portion and reflects a portion of the light incident on the light-receiving portion upward of the optical axis of the light-emission portion; and
an upper reflective portion that is disposed above the optical axis of the light-emission portion and reflects the light reflected from the lower reflective portion toward the light-emission portion,
wherein the light-receiving portion includes: a first light-receiving module disposed above the optical axis of the light-emission portion; and a second light-receiving module disposed under the optical axis of the light-emission portion,
wherein light incident to an upper region of the light-receiving portion is focused on a rear focus of the light-emission portion by the first light-receiving module,
wherein light incident to a lower region of the light-receiving portion is incident to the second light-receiving module and is focused on the rear focus of the light-emission portion through the lower reflective portion and the upper reflective portion,
wherein the lower reflective portion includes:
a first reflective surface that reflects light incident on the second light-receiving module so as to proceed laterally; and
a second reflective surface that is disposed on a side of the first reflective surface and reflects the light reflected from the first reflective surface so as to proceed upwardly, and
wherein the upper reflective portion reflects the light reflected upwardly from the second reflective surface so as to proceed in a frontward direction.

2. The lamp module of claim 1, wherein the light incident on the second light-receiving module proceeds as a light beam substantially parallel to the optical axis of the light-emission portion, and
wherein each of the first reflective surface and the second reflective surface of the lower reflective portion exhibits a planar shape.

3. The lamp module of claim 1, wherein the light incident on the second light-receiving module is focused on the rear focus of the light-emission portion, and wherein at least one of the first reflection surface or the second reflection surface of the lower reflective portion exhibits a curved shape to allow the light incident on the second light-receiving module to be converted into substantially parallel light.

4. The lamp module of claim 3, wherein the first light-receiving module and the second light-receiving module are formed symmetrically with each other so as to have substantially same light concentration characteristics.

5. The lamp module of claim 1, wherein the guiding member further includes a shield portion having a front end disposed at a rear focus of the light-emission portion so as to obstruct a portion of light that proceeds toward the light-emission portion such that a cut-off line of the beam pattern is formed.

6. The lamp module of claim 5, wherein the lower reflective portion further includes a transmission portion that allows a portion of the light incident on the second light-receiving module to transmit therethrough, and wherein light that passes through the transmission portion proceeds through a connection surface to the light-emission portion to form an additional beam pattern, wherein the connection surface connects a front end of the shield portion and a lower surface of the guiding member.

7. The lamp module of claim 1, wherein the light-emission portion includes a plurality of light-emission surfaces arranged in a left-right direction, and wherein at least one of a curvature, a formation angle, or a size of at least one of the plurality of light-emission surfaces is different from at least another of the plurality of light-emission surfaces.

8. The lamp module of claim 1, wherein the guiding member further includes a concave portion formed concavely in an upper surface thereof.

9. The lamp module of claim 8, wherein the concave portion allows a portion of the light incident to the light-emission portion that proceeds through an upper space above a rear focus of the light-receiving portion to be irradiated to a region disposed below the beam pattern.

10. A lamp module comprising:

a light source that generates light; and a light guide for guiding the light incident thereto from the light source to be emitted, wherein the light guide includes:

a light-receiving portion to which the light is incident from the light source;

a light-emission portion from which the light is emitted; and a guiding member that allows at least a portion of the light incident on the light-receiving portion to be transmitted to the light-emission portion and emitted from the light-emission portion to form a predetermined beam pattern, wherein the guiding member includes:

a lower reflective portion that is disposed under an optical axis of the light-emission portion and reflects a portion of the light incident on the light-receiving portion upward of the optical axis of the light-emission portion; and an upper reflective portion that is disposed above the optical axis of the light-emission portion and reflects the light reflected from the lower reflective portion toward the light-emission portion, wherein the light-receiving portion includes: a first light-receiving module disposed above the optical axis of the light-emission portion; and a second light-receiving module disposed under the optical axis of the light-emission portion, wherein light incident to an upper region of the light-receiving portion is focused on a rear focus of the light-emission portion by the first light-receiving module, wherein light incident to a lower region of the light-receiving portion is incident to the second light-receiving module and is focused on the rear focus of the light-emission portion through the lower reflective portion and the upper reflective portion, and wherein the first light-receiving module and the second light-receiving module are formed asymmetrically with each other so as to have different light concentration characteristics.

11. The lamp module of claim 10, wherein the first light-receiving module and the second light-receiving module have different curvatures in at least one direction.

12. The lamp module of claim 10, wherein the first light-receiving module and the second light-receiving module are formed to have different dimensions in at least one direction.

13. A lamp module comprising:

a light source that generates light; and a light guide for guiding the light incident thereto from the light source to be emitted, wherein the light guide includes:

a light-receiving portion to which the light is incident from the light source;

a light-emission portion from which the light is emitted; and a guiding member that allows at least a portion of the light incident on the light-receiving portion to be transmitted to the light-emission portion and emitted from the light-emission portion to form a predetermined beam pattern, wherein the guiding member includes:

a lower reflective portion that is disposed under an optical axis of the light-emission portion and reflects a portion of the light incident on the light-receiving portion upward of the optical axis of the light-emission portion;

an upper reflective portion that is disposed above the optical axis of the light-emission portion and reflects the light reflected from the lower reflective portion toward the light-emission portion; and a shield portion having a front end disposed at a rear focus of the light-emission portion so as to obstruct a portion of light that proceeds toward the light-emission portion such that a cut-off line of the beam pattern is formed, and wherein the shield portion further includes a shield groove disposed behind the front end and concavely formed to allow a portion of the cut-off line to be depressed downwardly.

* * * * *